(12) United States Patent
Akhtar et al.

(10) Patent No.: US 11,509,735 B2
(45) Date of Patent: Nov. 22, 2022

(54) METHOD AND SYSTEM FOR FACILITATING OPERATIONS IN STORAGE FACILITIES

(71) Applicant: GREY ORANGE PTE. LTD., Singapore (SG)

(72) Inventors: Sami Akhtar, Uttar Pradesh (IN); Srijan Choudhary, Chhattisgarh (IN)

(73) Assignee: GREY ORANGE PTE. LTD., Singapore (SG)

( * ) Notice: Subject to any disclaimer, the term of this patent is extended or adjusted under 35 U.S.C. 154(b) by 68 days.

(21) Appl. No.: 16/525,646

(22) Filed: Jul. 30, 2019

(65) Prior Publication Data

US 2021/0037106 A1 Feb. 4, 2021

(51) Int. Cl.
| | |
|---|---|
| *H04L 67/50* | (2022.01) |
| *H04L 47/80* | (2022.01) |
| *H04L 9/40* | (2022.01) |
| *H04L 67/306* | (2022.01) |

(52) U.S. Cl.
CPC .......... *H04L 67/535* (2022.05); *H04L 47/808* (2013.01); *H04L 63/105* (2013.01); *H04L 67/306* (2013.01)

(58) Field of Classification Search
CPC ...... H04L 67/22; H04L 67/306; H04L 63/105
USPC ....................................................... 709/224
See application file for complete search history.

(56) References Cited

U.S. PATENT DOCUMENTS

| | | | | |
|---|---|---|---|---|
| 8,140,368 | B2 * | 3/2012 | Eggenberger | G06Q 10/06398 705/7.14 |
| 2012/0078063 | A1 * | 3/2012 | Moore-Ede | G16H 10/20 600/300 |
| 2014/0136255 | A1 * | 5/2014 | Grabovski | G06Q 10/063114 705/7.14 |
| 2016/0148132 | A1 * | 5/2016 | Aqlan | G06Q 10/0635 705/7.16 |
| 2018/0025460 | A1 * | 1/2018 | Watanabe | G06Q 50/28 705/28 |
| 2019/0343429 | A1 * | 11/2019 | Elhawary | A61B 5/1118 |

OTHER PUBLICATIONS

King et al. "Modeling the ergonomics of Goods-to-Man order picking", file:///C:/Users/pngankam/Downloads/15040msIISE2019N0582706.pdf (Year: 2019).*

(Continued)

*Primary Examiner* — Umar Cheema
*Assistant Examiner* — Patrick F Ngankam
(74) *Attorney, Agent, or Firm* — Oblon, McClelland, Maier & Neustadt, L.L.P.

(57) ABSTRACT

A method for facilitating operations in storage facilities. A server receives a service request for performing a first operation in the storage facility. The server identifies a first storage unit based on the service request. The server identifies an operation zone of the first storage unit for performing the first operation. The server determines an ergonomic score for each operator for performing the first operation based on characteristics of the operation zone and the fatigue level of the corresponding operator. The server allocates the first storage unit to a first operator for performing the first operation, based on the determined ergonomic scores, thereby ensuring an increased throughput of the storage facility.

18 Claims, 15 Drawing Sheets

(56) References Cited

OTHER PUBLICATIONS

King et al. "Modeling the ergonomics of Goods-to-Man order picking", https://www.proquest.com/openview/6cb6f2fba39059f815c32858650dd830/1.pdf?pq-origsite=gscholar&cbl=51908 (Year: 2019).*

International Search Report and Written Opinion dated Oct. 27, 2020 in PCT/IB2020/000633, citing document AA therein, 14 pages.

* cited by examiner

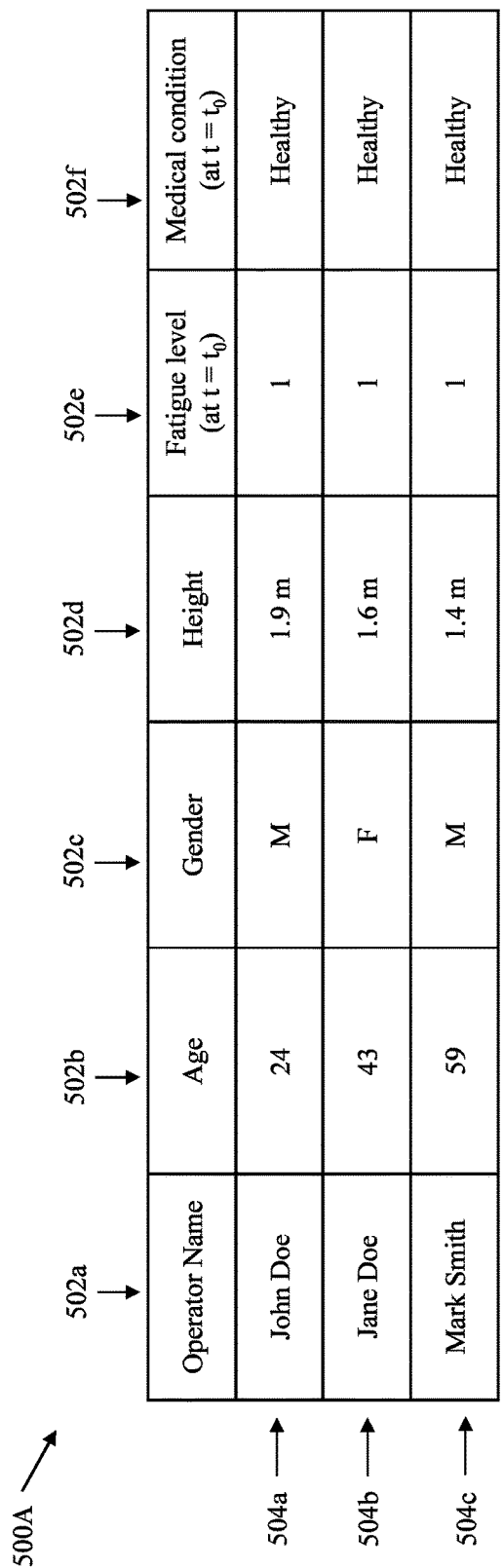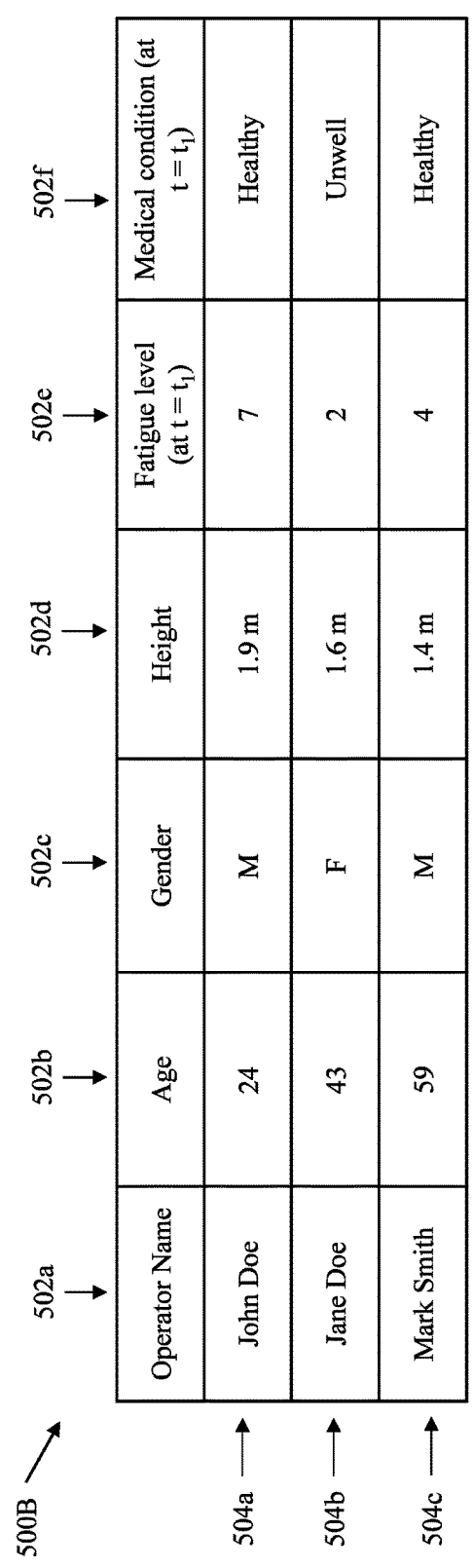
FIG. 5A
FIG. 5B

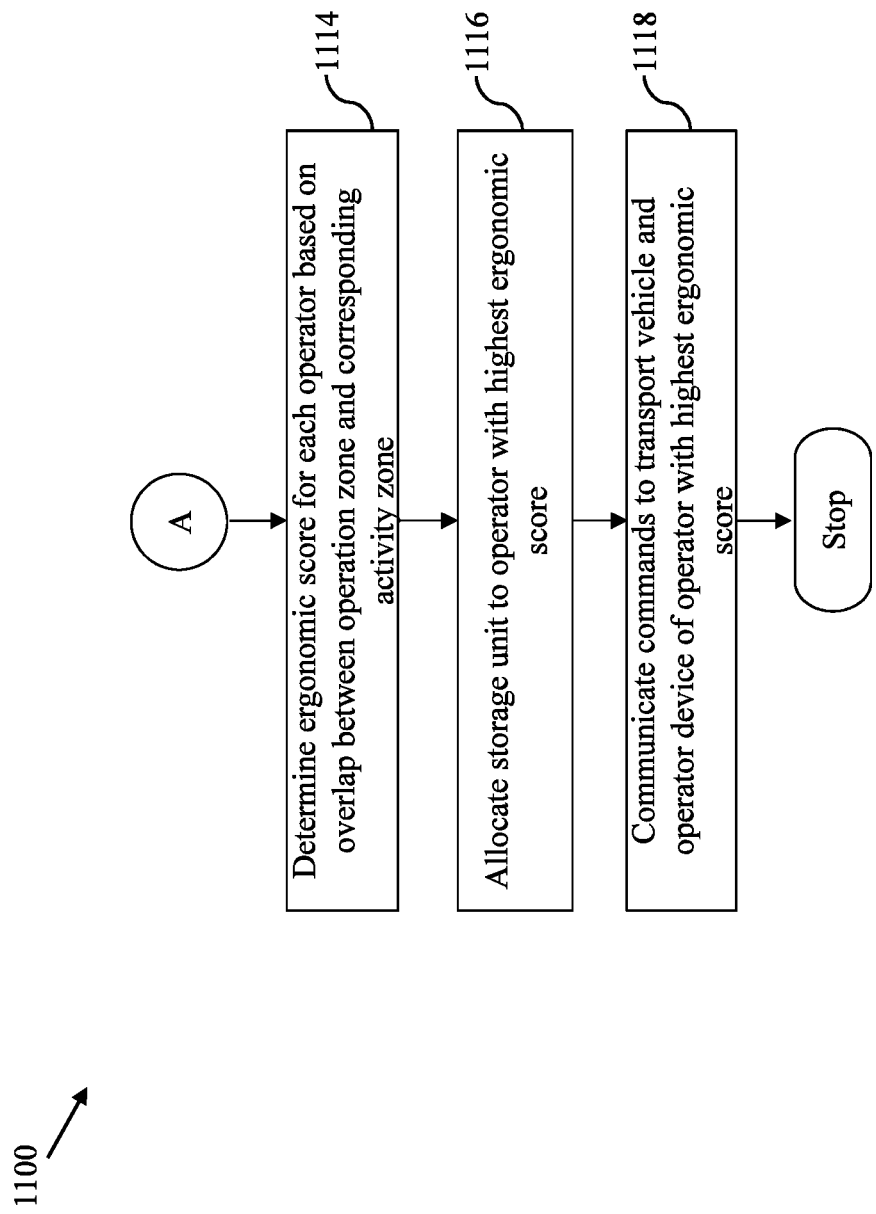

METHOD AND SYSTEM FOR FACILITATING OPERATIONS IN STORAGE FACILITIES

FIELD

The present disclosure relates generally to management of storage facilities, and, more particularly, to a method and a system for facilitating operations in a storage facility.

BACKGROUND

An organization (e.g., an e-commerce entity, a courier delivery company, or the like) may store items in storage facilities prior to delivering the items to corresponding destinations. Throughputs of operations in such storage facilities may have a direct bearing on various business metrics (e.g., time taken to complete deliveries, total number of deliveries completed within a time duration, customer satisfaction, or the like) that are of interest to the organization. For example, a throughput of a storage facility may affect the time taken to complete deliveries, a number of the completed deliveries, or the like. Hence, it is necessary to optimize various operations performed at these storage facilities to realize maximum throughputs at the storage facilities.

Typically, a storage facility involves various operators to perform the operations at the storage facility. A speed at which each operator performs an allocated task (e.g., placing items in storage units of the storage facility or retrieving items from the storage units) constitutes a critical bottleneck in the operations at the storage facility. Sub-optimal allocation of tasks to the operators may result in a failure to realize a maximum throughput of the storage facility. Typically, in the storage facility, physical characteristics (e.g., age, strength, duration of work, or the like) of the operators are not taken into account while allocating the tasks to the operators. Thus, allocation of the tasks to the operators is not optimized, which results in inefficiencies in the operations performed at the storage facility and may adversely affect the business metrics of a corresponding organization.

In light of the foregoing, there exists a need for a technical solution that solves the above-mentioned problems and optimizes allocation of tasks to operators in a storage facility.

SUMMARY

In an embodiment of the present disclosure, a method for facilitating one or more operations in a storage facility is provided. The method includes receiving, by a server, a service request for performing a first operation in the storage facility. From a plurality of storage units in the storage facility, a first storage unit is identified by the server based on the service request. An operation zone of the first storage unit is identified by the server for performing the first operation. A plurality of ergonomic scores for a plurality of operators in the storage facility are determined by the server. An ergonomic score for each operator is determined based on one or more characteristics of the operation zone and a fatigue level of the corresponding operator. The first storage unit is allocated, by the server, to a first operator of the plurality of operators for performing the first operation, based on the plurality of ergonomic scores.

In another embodiment of the present disclosure, a system for facilitating one or more operations in a storage facility is provided. The system includes a server configured to receive a service request for performing a first operation in the storage facility. The server identifies, based on the service request, a first storage unit from a plurality of storage units in the storage facility. The server identifies an operation zone of the first storage unit for performing the first operation. The server determines a plurality of ergonomic scores for a plurality of operators in the storage facility, respectively. An ergonomic score for each operator of the plurality of operators is determined based on one or more characteristics of the operation zone and a fatigue level of the corresponding operator. The server allocates the first storage unit to a first operator of the plurality of operators for performing the first operation, based on the plurality of ergonomic scores.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIG. 5A is an exemplary table that illustrates information of first through third operators of FIG. 1, maintained at a control server of FIG. 1 at a first time-instance, in accordance with an embodiment of the present disclosure;

FIG. 5B is a table that illustrates updated information of the first through third operators, maintained at the control server at a second time-instance, in accordance with an embodiment of the present disclosure;

FIGS. 11A and 11B, collectively represent a flow chart that illustrates the method for facilitating one or more operations in the storage facility, in accordance with an embodiment of the present disclosure.

Figure 1:
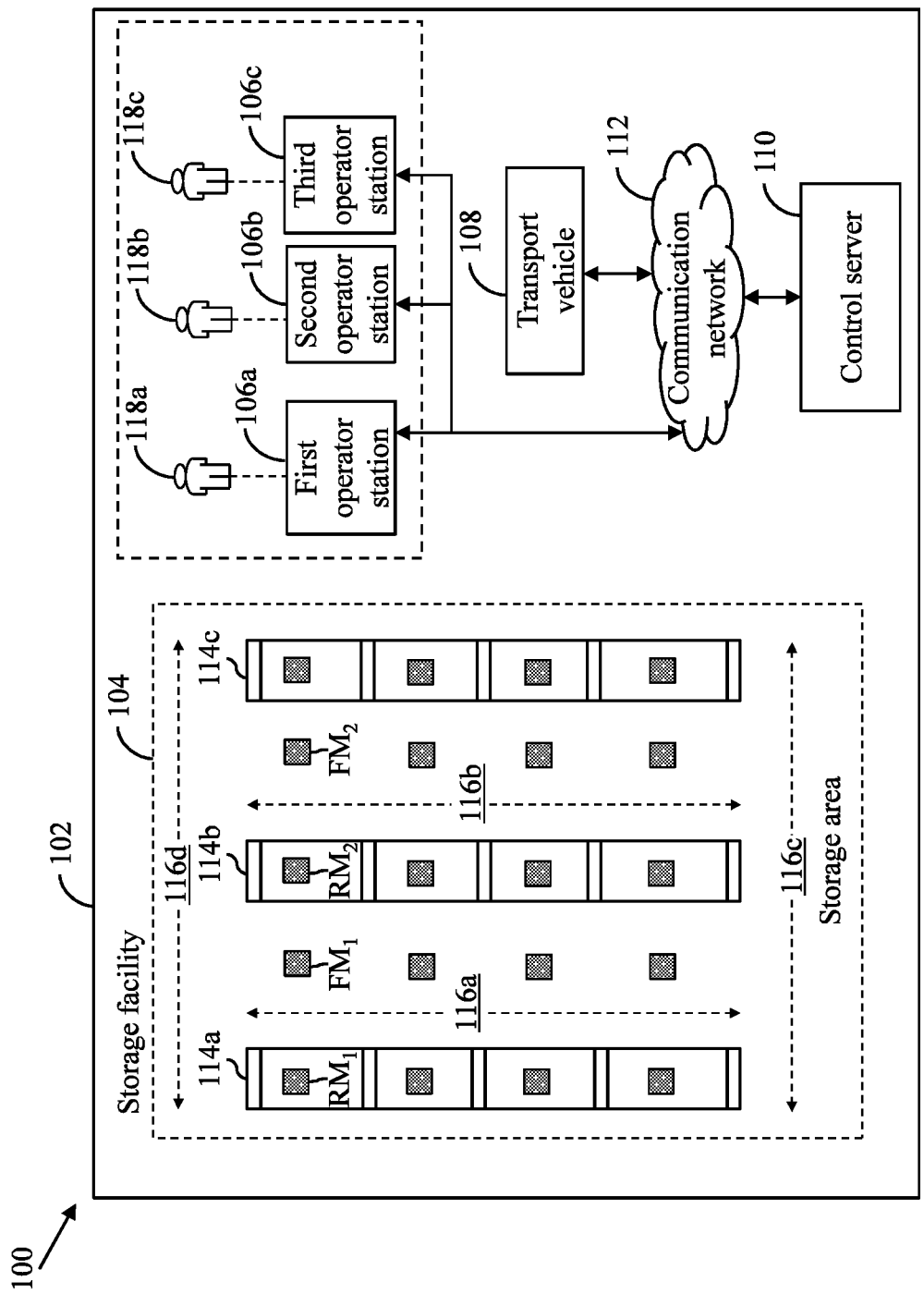
FIG. 1 is a block diagram that illustrates an exemplary environment, in accordance with an embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present disclosure provide a method and a system for facilitating operations in a storage facility. A server, associated with the storage facility, may receive a service request for performing a first operation in the storage facility. Examples of the service request may include, but are not limited to, placement of one or more items in the storage facility or retrieval of one or more items from the storage facility. Based on the service request, the server may identify a first storage unit for performing the first operation. The server may further identify an operation zone of the first storage unit for performing the first operation. The operation zone of the first storage unit may be a region of the first storage unit where the first operation is to be performed. For each operator in the storage facility, the server may determine an activity zone corresponding to the first storage unit. The activity zone of each operator may be determined based on various physical characteristics (e.g., a height, an age, a gender, a strength level, a medical condition, or a fatigue level) of the corresponding operator. The determination of the activity zone of each operator may be further based on item characteristics (e.g., a size, a shape, a weight, or a type) of items associated with the first operation and/or dimensions and a height of a pick and place station associated with the corresponding operator. Based on the operation zone and the activity zone of each operator, the server may determine an ergonomic score for each operator for performing the first operation. An ergonomic score for an operator may be indicative of a degree of ease with which the operator may perform the first operation. Based on the ergonomic score of each operator, the server may identify a first operator most suited for performing the first operation. Based on the identification, the server may allocate the first storage unit to the first operator for performing the first operation.

The server may facilitate various operations (e.g., the first operation) or tasks such as, but not limited to, placement of items or retrieval of items from the storage facility. The server facilitates optimal allocation of the tasks to operators, enhancing a productivity and an efficiency of each operator and improving a convenience of the operators by reducing physical exertion by the operators. The enhancement of the productivity and efficiency of each operator may enable organizations to achieve desired business outcomes (e.g., reduced delivery time from storage facility to destination). The server also ensures that the general parameters are met which may or may not supersede the method disclosed in the disclosure. These general parameters may be, but not limited to, time to fulfill orders, order quantity, order processing speed, order size consideration, or the like.

Terms Description (In Addition to Plain and Dictionary Meaning)

Below are non-limiting embodiments of terms used in the present disclosure.

"Storage facility" includes various storage units for storing items. The storage facility may further include aisles for transport vehicles to move in the storage facility. Examples of the storage facility may include, but are not limited to, a forward warehouse, a backward warehouse, or a retail store.

"Storage unit" is a physical structure, in a storage facility, that stores various items. The storage unit may include shelves, slots, and/or partitions for storing the items. The storage unit may be portable or fixed.

"Operation zone" is a region of a storage unit where an operation is to be performed. For example, in a scenario where an item is to be placed on a first shelf of the storage unit, the operation zone may encompass the first shelf. The operation zone may be defined by the dimensions of the first shelf and a height of the first shelf from a floor level of the storage facility.

"Activity zone" of an operator refers to a region of a storage unit that is accessible by the operator, for an operation, without having to exert undue physical stress. The activity zone of the operator for the operation depends on various factors such as, but not limited to, physical characteristics of the operator, item characteristics of an item corresponding to the operation, characteristics of the storage unit, or the like. For example, for an operation, a region encompassing top two shelves of a storage unit may constitute an activity zone of an operator for the operation.

"Ergonomic score" is a score that indicates a degree of ease with which an operator may perform an operation such as, but not limited to, a placement or a retrieval of an item from a storage unit. The ergonomic score may be determined based on characteristics of an operation zone of a storage unit associated with the operation and characteristics of an activity zone of the operator. The ergonomic score may be expressed as an absolute number, as a percentage, or as a category.

"Fatigue level" refers to a measurement pertaining to a level of tiredness or lack of energy of an operator. In a non-limiting example, the fatigue of level of the operator may be quantified numerically such that a higher value of the fatigue level corresponds to a higher level of tiredness.

FIG. 1 is a block diagram that illustrates an exemplary environment 100, in accordance with an embodiment of the present disclosure. The environment 100 shows a storage facility 102. The storage facility 102 includes a storage area 104, first through third operator stations 106a-106c (hereinafter, the first through third operator stations 106a-106c are referred to as 'the operator stations 106'), a transport vehicle 108, and a control server (CS) 110. The CS 110 communicates with the operator stations 106 and the transport vehicle 108 by way of a communication network 112 or through separate communication networks established therebetween.

Figure 2:
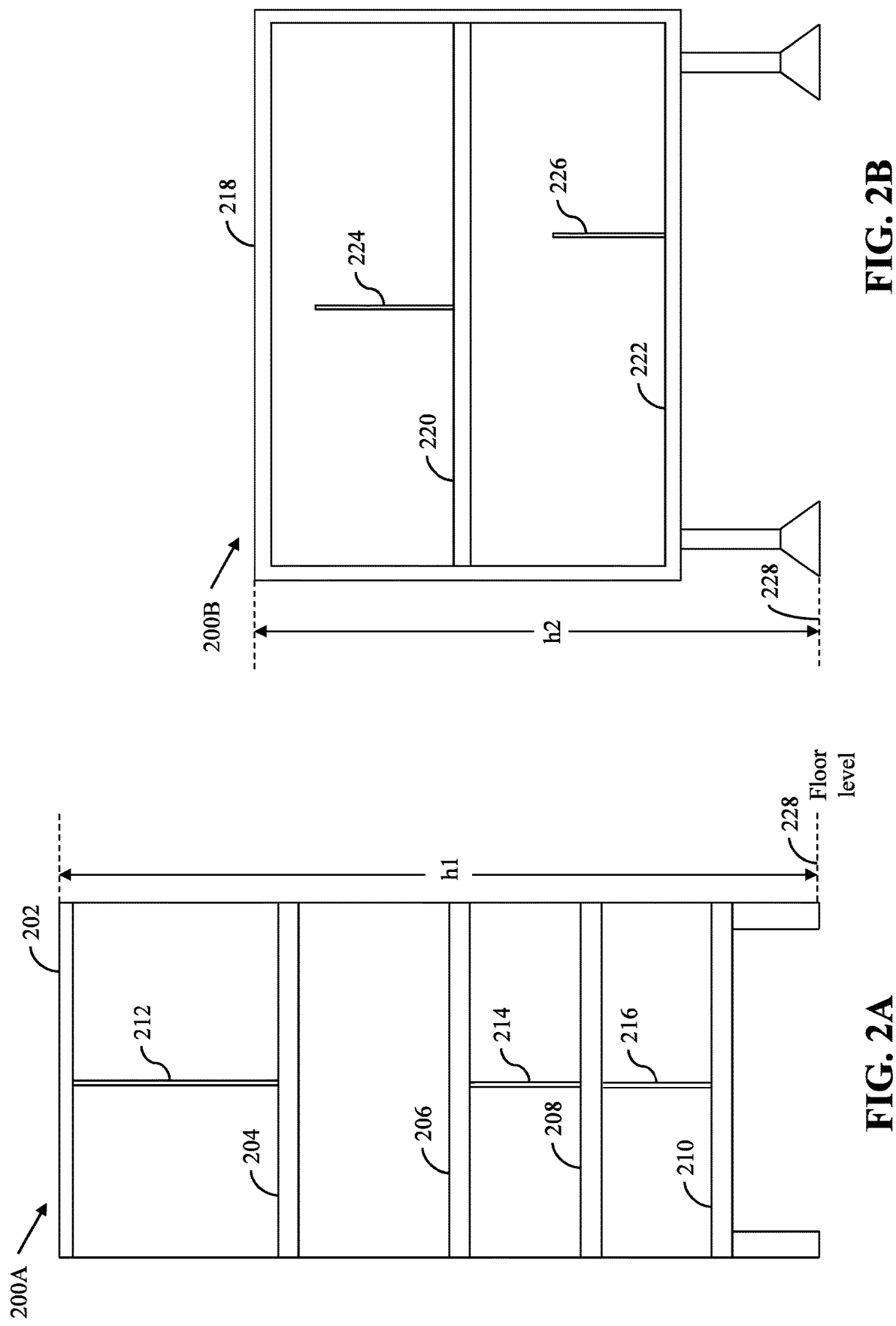
FIG. 2A is a block diagram that illustrates a front view of a storage unit in a storage facility of FIG. 1, in accordance with an embodiment of the present disclosure.
FIG. 2B is a block diagram that illustrates a front view of a pick-and-put station in the storage facility, in accordance with an embodiment of the present disclosure.

The storage facility 102 stores multiple inventory items for fulfillment and/or selling. Examples of the storage facility 102 may include, but are not limited to, a forward warehouse, a backward warehouse, a fulfilment center, or a retail store (e.g., a supermarket, an apparel store, or the like). Examples of the inventory items may include, but are not limited to, groceries, apparel, or the like. The inventory items are stored in the storage area 104. The storage area 104 may be of any shape, for example, a rectangular shape. The storage area 104 includes first through third racks 114a-114c that are formed by linearly arranging various storage units (as shown in FIG. 2A). Hereinafter, the first through third racks 114a-114c are collectively referred to as 'the racks 114'. One or more inventory items are allocated to each storage unit and each storage unit stores the corresponding allocated inventory items. In one embodiment, the storage units may have different shapes, sizes, and dimensions. Hereinafter, the terms 'inventory items' and 'items' are used interchangeably. It will be apparent to a person of ordinary skill in the art that the racks 114 are not hardware structures and merely represent a combination of the storage units.

The racks 114 are arranged such that first through fourth aisles 116a-116d are formed therebetween. Hereinafter, the first through fourth aisles 116a-116d are collectively referred to as 'the aisles 116'. The first aisle 116a is formed between the first and second racks 114a and 114b. The second aisle 116b is formed between the second and third racks 114b and 114c. The third and fourth aisles 116c and 116d are formed between side faces of the racks 114 and a sidewall of the storage area 104. The aisles 116 are passageways used by customers or the transport vehicle 108 to move in the storage area 104. Arrangement of the racks 114 may be performed in any desired configured known to those of skill in the art. In a non-limiting example, it is assumed that the racks 114 are arranged such that a layout of the aisles 116 forms a virtual grid in a rectangular space. Thus, each aisle 116 is one of a horizontal aisle or a vertical aisle. For example, the first aisle 116a is a vertical aisle and the fourth aisle 116d is a horizontal aisle. An intersection between horizontal and vertical aisles forms a cross-aisle.

In one embodiment, the storage facility 102 may be marked with various fiducial markers (e.g., fiducial markers $FM_1$, $FM_2$, $RM_1$, and $RM_2$). Fiducial markers are markers placed in the storage facility 102 for uniquely identifying different locations in the storage facility 102, each of the racks 114, or the like. For the sake of simplicity, the storage area 104 has been shown to include multiple fiducial markers and only the fiducial markers $FM_1$, $FM_2$, $RM_1$, and $RM_2$ have been labelled. It will be apparent to those of skill in the art that the entire storage facility 102 may include the fiducial markers without deviating from the scope of the disclosure. Each fiducial marker may correspond to one of two types—location markers (e.g., the fiducial markers $FM_1$ and $FM_2$) and rack markers (e.g., the fiducial markers $RM_1$ and $RM_2$). The location markers (e.g., the fiducial markers $FM_1$ and $FM_2$) are located at pre-determined locations in the storage facility 102. The pre-determined locations may not conform to any specific pattern and may be subject to a configuration of the storage facility 102. For example, the fiducial markers $FM_1$ and $FM_2$ are located at first and second locations (e.g., on the floor of the storage area 104) along the first and second aisles 116a and 116b, respectively. The rack markers (e.g., the fiducial markers $RM_1$ and $RM_2$) may uniquely identify each storage unit that constitutes the racks 114. For example, the fiducial markers $RM_1$ and $RM_2$ uniquely identify storage units that partly constitute the first and second racks 114a and 114b, respectively. Examples of the fiducial markers include, but or not limited to, barcodes, quick response (QR) codes, radio frequency identification device (RFID) tags, or the like. In one embodiment, a placement of the fiducial markers is uniform (i.e., a distance between consecutive fiducial markers is constant). In another embodiment, the placement of the fiducial markers may be non-uniform (i.e., a distance between consecutive fiducial markers is variable). In other embodiments, the storage facility 102 may not be marked with any fiducial markers. In such a scenario, different locations in the storage facility 102 may be determined by using global positioning system (GPS) coordinates or other localization technology-based coordinates.

The operator stations 106 in the storage facility 102 include pick-and-put stations (PPSs) for holding inventory items that are to be placed in the storage units or inventory items that are retrieved from the storage units. Each operator station 106 may be manned by one or more operators. For example, the first through third operator stations 106a-106c are manned by first through third operators 118a-118c, respectively. The storage units are transported to the operator stations 106 by transport vehicles (e.g., the transport vehicle 108). Although the storage facility 102 is shown to include three operator stations 106, it will be apparent to those of skill in the art that the storage facility 102 may include any number of operator stations without deviating from the scope of disclosure. The operator stations 106 may include operator devices that receive various commands or instructions from the CS 110 for placing the inventory items in the storage units or retrieving the inventory items from the storage units. Based on the received commands or instructions, the first through third operators 118a-118c at the operator stations 106 place the inventory items in the storage units or retrieve the inventory items from the storage units. An item placement operation involves, in some examples, picking up one or more inventory items from a PPS and placing the picked inventory items in the storage unit. Similarly, an item retrieval operation involves retrieving one or more inventory items from a storage unit and placing the retrieved inventory items on the PPS. In another embodiment, the operator stations 106 may include robotic operators for performing item placement and item retrieval operations, without deviating from the scope of the disclosure.

The transport vehicle 108 is a robotic vehicle that moves in the storage facility 102. For example, the transport vehicle 108 is an automatic guided vehicle (AGV) that is responsive to commands received from the CS 110. The transport vehicle 108 may include suitable logic, instructions, circuitry, interfaces, and/or codes, executable by the circuitry, for transporting payloads (e.g., the storage units or the racks 114) in the storage facility 102 based on the commands received from the CS 110. For example, the transport vehicle 108 may carry and transport the storage units from the storage area 104 to the operator stations 106 and from the operator stations 106 to the storage area 104 for fulfilment of orders, loading of inventory items into the storage units, and/or the like. The transport vehicle 108 may be configured to read the fiducial markers (e.g., the fiducial markers $FM_1$, $FM_2$, $RM_1$, and $RM_2$). The transport vehicle 108 may include various sensors (e.g., image sensors, RFID sensors, and/or the like) for reading the fiducial markers. The transport vehicle 108 may utilize the fiducial markers for determining a relative position of the transport vehicle 108 within the storage facility 102 and/or identifying the racks 114 or the storage units. For the sake of simplicity, the storage facility 102 is shown to have a single transport vehicle (i.e., the transport vehicle 108). It will be apparent to those of skill in the art that the storage facility 102 may include any number of transport vehicles without deviating from the scope of the disclosure.

The CS 110 may be a network of computers, a software framework, or a combination thereof, that may provide a generalized approach to create the server implementation. Examples of the CS 110 include, but are not limited to, personal computers, laptops, mini-computers, mainframe computers, any non-transient and tangible machine that can execute a machine-readable code, cloud-based servers, distributed server networks, or a network of computer systems. The CS 110 may be realized through various web-based technologies such as, but not limited to, a Java web-framework, a .NET framework, a personal home page (PHP) framework, or any web-application framework. The CS 110 may be maintained by a warehouse management authority or a third-party entity that facilitates inventory management operations for the storage facility 102. It will be apparent to a person of ordinary skill in the art that the CS 110 may perform other warehouse management operations as well along with the inventory management operations.

Figure 9:
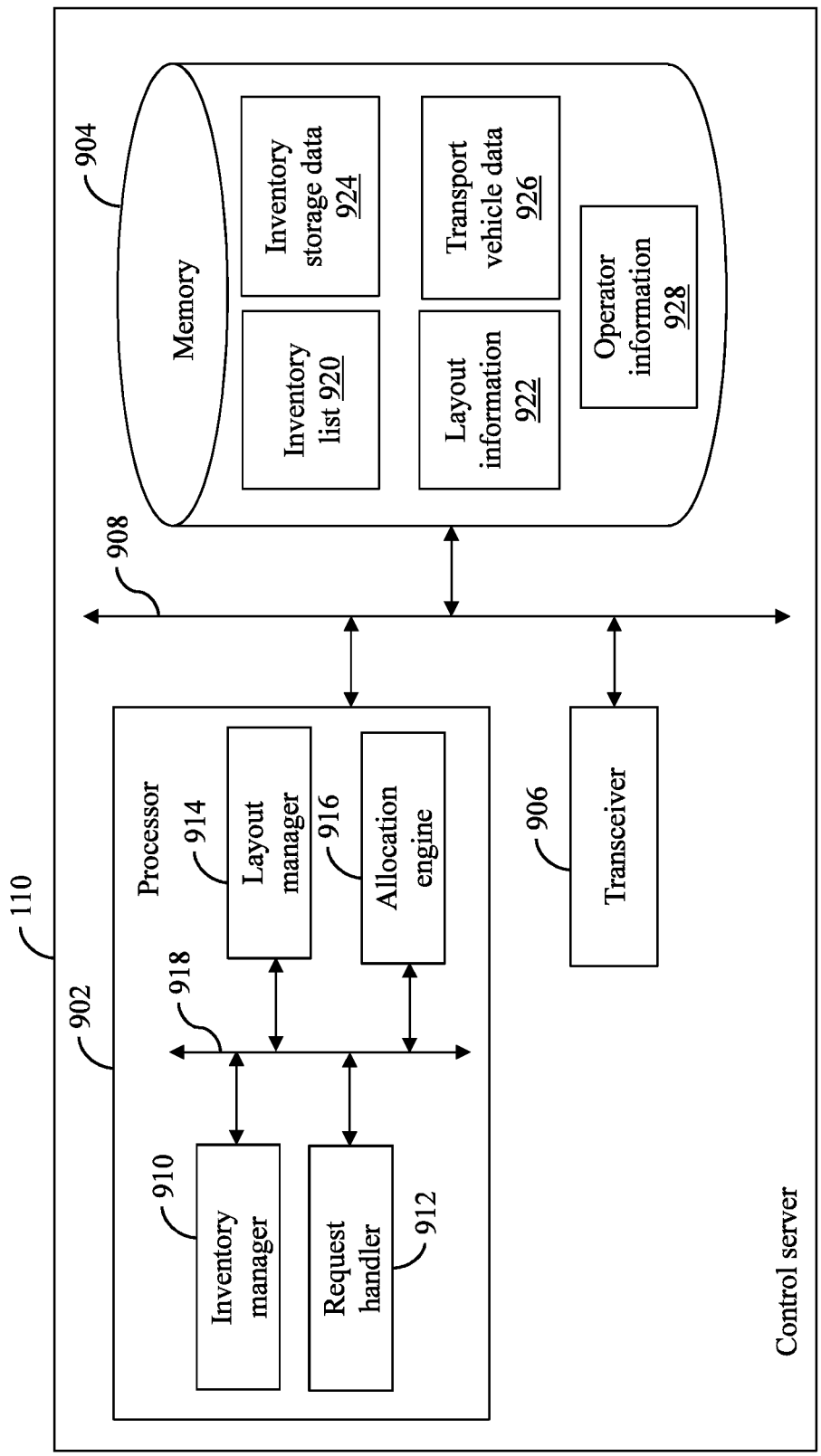
FIG. 9 is a block diagram that illustrates a control server of FIG. 1, in accordance with an embodiment of the present disclosure.

The CS 110 may store, in a memory of the CS 110, a virtual map and inventory storage data (as shown in FIG. 9) of the storage facility 102. The virtual map is indicative of the current location of the racks 114, the storage units, the operator stations 106, entry and exit points of the storage facility 102, the fiducial markers in the storage facility 102, or the like. The inventory storage data is indicative of associations between the inventory items stored in the storage facility 102 and the storage units in the storage facility 102. The CS 110 may further maintain information regarding physical characteristics of the first through third operators 118a-118c. For example, the physical characteristics of the first operator 118a may include, but not limited to, a height of the first operator 118a, an age of the first operator 118a, a gender of the first operator 118a, a level of strength of the first operator 118a at any time instance, a current level of fatigue of the first operator 118a, a medical condition of the first operator 118a, or the like. Similarly, the information regarding the physical characteristics of the second and third operators 118b and 118c may be maintained at the CS 110.

The CS 110 may receive various service requests from an external communication server for item retrieval from the storage facility 102 and item placement in the storage facility 102. Based on the received service requests, the CS 110 may identify one or more storage units in the storage facility 102 that are associated with inventory items indicated by the received service requests. The CS 110, may then identify, for each received service request, an operator (e.g., the first through third operators 118a-118c) who is most suited to perform an operation (e.g., an item placement operation or an item retrieval operation) associated with the corresponding service request. Based on the identification, the CS 110 may allocate one or more storage units to each identified operator for performing the corresponding operation. Various components of the CS 110 and functionalities of the components are described later in conjunction with FIG. 9.

The communication network 112 is a medium through which content and messages are transmitted between the CS 110, the operator stations 106, and the transport vehicle 108. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the CS 110 may receive, from the external communication server, a service request for storing first and second items in the storage facility 102. Based on the received service request, the CS 110 may identify a storage unit in the storage facility 102 for storing the first and second items. The CS 110 may then identify an operation zone of the identified storage unit for storing the first and second items. The operation zone may be a region of the identified storage unit, where the first and second items are to be stored. The CS 110 may identify the operation zone based on item characteristics (e.g., sizes, shapes, weights, or types) of the first and second items, and/or characteristics (e.g., dimensions of shelves, heights of the shelves from a floor level of the storage facility 102) of the identified storage unit. After identifying the operation zone, the CS 110 may determine an ergonomic score for each of the first through third operators 118a-118c for placing the first and second items in the identified storage unit. The ergonomic score for each operator 118a-118c may be indicative of a degree of ease, of the corresponding operator 118a-118c, for placing the first and second items in the operation zone of the identified storage unit. Thus, a higher ergonomic score corresponds to a greater ease in placing the first and second items in the operation zone of the identified storage unit. The ergonomic score of an operator (e.g., the first operator 118a) may be a function of one or more physical characteristics of the corresponding operator, characteristics of the operation zone of the identified storage unit, characteristics of the corresponding PPS, or the item characteristics of the first and second items. It will be apparent to those of skill to the art that the ergonomic score of each operator 118a-118c may be a function of various time-dependent parameters such as, but not limited to, level of fatigue (e.g., the current level of fatigue of the first operator 118a). Consequently, the ergonomic score for each operator 118a-118c may be a function of time. In other words, the ergonomic score of each operator 118a-118c may be dynamic.

Based on the ergonomic scores of the first through third operators 118a-118c, the CS 110 may then allocate the first storage unit to an operator (e.g., the first operator 118a) of the first through third operators 118a-118c, for placing the first and second items in the operation zone of the identified storage unit. In one example, the CS 110 may allocate the identified storage unit to the operator (e.g., the first operator 118a) with the highest ergonomic score. Based on the allocation, the CS 110 may communicate commands to the transport vehicle 108, instructing the transport vehicle 108 to retrieve the identified storage unit from a corresponding rack and transport the identified storage unit to the first operator station 106a of the first operator 118a. The commands may include navigation information for the transport vehicle 108 to reach, from a current location of the transport vehicle 108, a location of the identified storage unit and, then, a location of the first operator station 106a. In other words, the navigation information may define an optimal path to reach the first operator station 106a after the identified storage unit is picked by the transport vehicle 108. In some embodiments, the optimal path is characterized by various fiducial markers (or GPS coordinates) that need to be traversed by the transport vehicle 108. In other words, the optimal path is defined by a sequence of the fiducial markers that are to be traversed by the transport vehicle 108 to reach the first operator station 106a from the current location after picking the identified storage unit. The navigation information may further include an identifier (e.g., a rack marker) of the identified storage unit that is to be transported by the transport vehicle 108. The CS 110 may, further, communicate commands to a first operator device of the first operator 118a, instructing the first operator 118a to place the first and second items in the identified storage unit. The commands may further instruct the first operator 118a to retrieve the first and second items from a first PPS of the first operator station 106a. When the transport vehicle 108 carrying the identified storage unit reaches the first operator station 106a, the first operator 118a may retrieve the first and second items from the first PPS and place the first and second items in the operation zone of the identified storage unit. In other embodiments, the CS 110 may employ the GPS-based navigation or other localization technology-based navigation, instead of the fiducial markers, to enable the transport vehicle 108 to traverse the storage facility 102.

FIG. 2A is a block diagram that illustrates a front view 200A of a first storage unit 202 in the storage facility 102, in accordance with an embodiment of the disclosure. As shown in FIG. 2A, the first storage unit 202 is of height 'h1' and includes first through fourth shelves 204-210 for storing inventory items. The first, third, and fourth shelves 204, 208, and 210 include first through third partitions 212-216, respectively. It will be apparent to those of skill in the art that the first storage unit 202 shown is merely exemplary and that the first storage unit 202 may be of any shape or size without deviating from the scope of the disclosure. In a non-limiting example, the first storage unit 202 partly constitutes the first rack 114a. Although the first storage unit 202 is shown to be empty, one of ordinary skill in the art would understand that the first storage unit 202 may be filled with any desired amount of items.

FIG. 2B is a block diagram that illustrates a front view 200B of the first PPS in the storage facility 102 in accordance with an embodiment of the present disclosure. Hereinafter, the first PPS is designated as 'the first PPS 218'. As shown in FIG. 2B, the first PPS 218 is of height 'h2' and includes first and second PPS shelves 220 and 222 for holding inventory items. The first and second PPS shelves 220 and 222 include first and second PPS partitions 224 and 226, respectively. In another embodiment, the first PPS 218 may be supplemented with a conveyor system. It will be apparent to those of skill in the art that the first PPS 218 shown is merely exemplary and that the first PPS 218 may be of any shape or size without deviating from the scope of the disclosure. Second and third PPSs associated with the second and third operator stations 106b and 106c, respectively, may be functionally similar to the first PPS 218.

Figure 3:
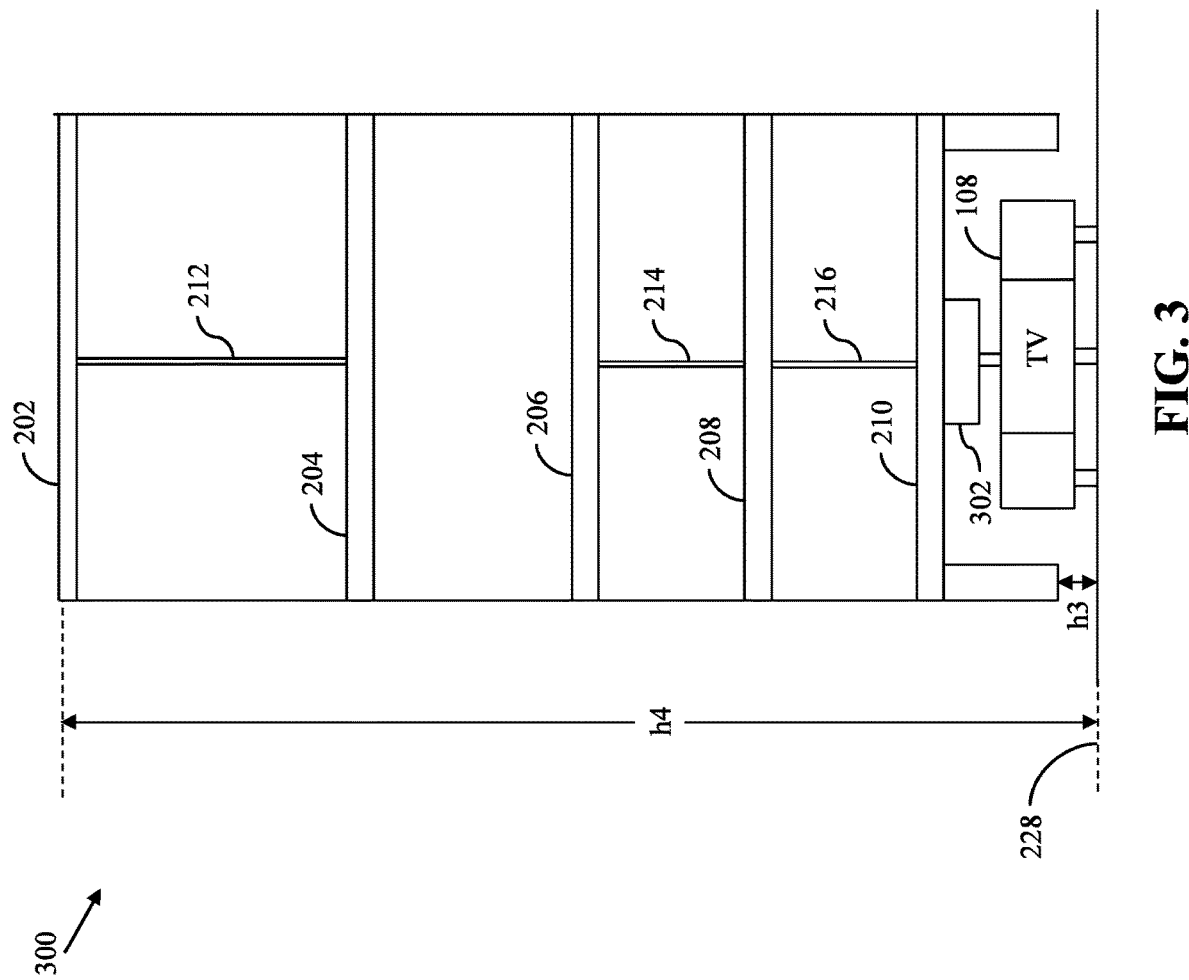
FIG. 3 is a block diagram that illustrates a transport vehicle of FIG. 1 carrying the storage unit, in accordance with an embodiment of the present disclosure.

FIG. 3 is a block diagram 300 that illustrates the transport vehicle 108 carrying the first storage unit 202, in accordance with an embodiment of the present disclosure. The transport vehicle 108 may reach a location of the first storage unit 202 and carry the first storage unit 202 based on the commands received from the CS 110. In a non-limiting example, the first storage unit 202 is empty. As shown in FIG. 3, a first contact plate 302 of the transport vehicle 108 is raised to lift the first storage unit 202. The first storage unit 202 is raised by a height of 'h3' from the floor level (hereinafter, referred to as 'the floor level 228') by the transport vehicle 108. As a result, a top of the first storage unit 202 is now at a height of 'h4' from the floor level 228.

Figures 4A, 4B, 4C:
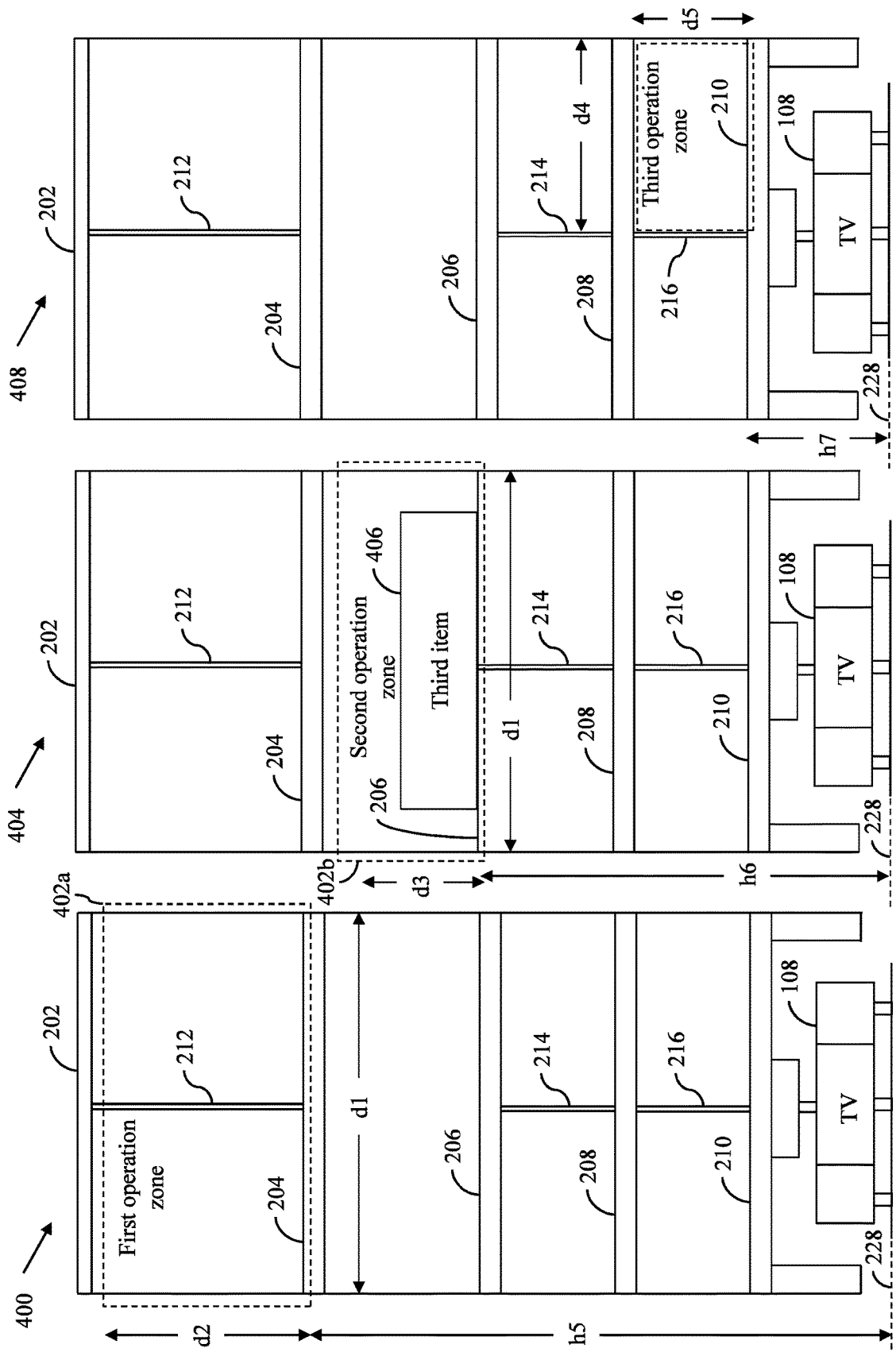
FIG. 4A is a block diagram of an exemplary scenario that describes a method for identifying an operation zone of a storage unit, in accordance with an embodiment of the present disclosure.
FIG. 4B is a block diagram of an exemplary scenario that describes a method for identifying an operation zone of a storage unit, in accordance with another embodiment of the present disclosure.
FIG. 4C is a block diagram of an exemplary scenario that describes a method for identifying an operation zone of a storage unit, in accordance with another embodiment of the present disclosure.

FIG. 4A is a block diagram of an exemplary scenario 400 that describes a method for identifying an operation zone of a storage unit, in accordance with an embodiment of the present disclosure. The scenario 400 involves the first storage unit 202, the transport vehicle 108, and the CS 110.

The CS 110 may receive a first service request, which is an item placement request, from the external communication server. Based on the first service request, the CS 110 may determine that first and second items have to be placed in the storage area 104. The CS 110 may identify, from a plurality of storage units in the storage area 104, a first set of storage units that is associated with the first and second items. For example, the first set of storage units may include storage units that are allocated for storing the first and second items. In another example, the first set of storage units may include those storage units that are currently available for storing the first and second items. After identifying the first set of storage units, the CS 110 may select one or more storage units from the first set of storage units for storing the first and second items. For example, the CS 110 may select one storage unit for storing the first item and another storage unit for storing the second item. In another example, the CS 110 may select a single storage unit for storing both the first and second items. For the sake of simplicity, it is assumed that the CS 110 selects the first storage unit 202 for storing the first and second items. Hereinafter, the placement of the first and second items in the first storage unit 202 is referred to as 'a first operation'.

After selecting the first storage unit 202, the CS 110 identifies a first operation zone 402a of the first storage unit 202. The first operation zone 402a is a region of the first storage unit 202 where the first and second items are to be placed for storing. The CS 110 may identify the first operation zone 402a based on the item characteristics of the first and second items and/or the characteristics of the first storage unit 202. The item characteristics of the first and second items may include, but are not be limited to, dimensions of the first and second items, weights of the first and second items, or types of the first and second items. The characteristics of the first storage unit 202 may include, but are not be limited to, dimensions of shelves in the first storage unit 202, a height of each shelf of the first storage unit 202 from the floor level 228, or a center of gravity of the first storage unit 202. The type of the first and second items may be based on a category of the items such as electronics, print media, consumable goods, etc.

In one example, the CS 110 may identify that to maintain the center of gravity of the first storage unit 202 in a permissible range, the first item has to be placed on a first portion of the first shelf 204 that is to a left of the first partition 212 and the second item has to be placed on a second portion of the third shelf 208 that is to a right of the second partition 214. In such a scenario, the first operation zone 402a identified by the CS 110 may encompass the first and second portions. In another example, the CS 110 may identify that no other shelf in the first storage unit 202 except the first shelf 204 is compatible to accommodate the weights and sizes of the first and second items. In this scenario, the first operation zone 402a identified by the CS 110 encompasses a region of the first storage unit 202 between the first shelf 204 and the top of the first storage unit 202 (as shown in FIG. 4A). The CS 110 may further determine that the first item may be stored on a portion of the first shelf 204 that is to a left of the first partition 212 and the second item may be placed on another portion of the first shelf 204 that is to a right of the first partition 212. The first operation zone 402a may be of a length 'd1' (i.e., length of the first shelf 204) and a breadth 'd2' (i.e., breadth of the first shelf 204). Since the first shelf 204 is at a height 'h5' from the floor level 228, the first operation zone 402a is at the height 'h5' from the floor level 228.

The CS 110 may utilize the first operation zone 402a for determining an ergonomic score for each of the first through third operators 118a-118c. The determination of the ergonomic score of the first operator 118a is described later in conjunction with FIG. 8A.

FIG. 4B is a block diagram of an exemplary scenario 404 that describes a method for identifying an operation zone of a storage unit, in accordance with another embodiment of the present disclosure. The scenario 404 involves the transport vehicle 108, the CS 110, the first storage unit 202, and a third item 406 stored in the first storage unit 202.

In the exemplary scenario 404, the CS 110 may receive a second service request, which is an item retrieval request, from the external communication server. Based on the second service request, the CS 110 may determine that the third item 406 is to be retrieved from the storage area 104 for fulfilment of an item order. The CS 110 may then identify a storage unit in the storage area 104 that has the third item 406 stored therein. In one exemplary scenario, of all storage units in the storage facility 102, only the first storage unit 202 may have the third item 406 stored therein. The third item 406 may be stored on the second shelf 206. Thus, the CS 110 may identify the first storage unit 202 and associate the first storage 202 with the second service request. In other words, the CS 110 may identify the first storage unit 202 for retrieving the third item 406. The CS 110 may then identify a second operation zone 402b for retrieving the third item 406. Hereinafter, the retrieval of the third item 406 from the second shelf 206 is referred to as 'a second operation'. The second operation zone 402b refers to a region of the first storage unit 202 where the second operation is to be performed. In other words, the second operation zone 402b is the region of the first storage unit 202 from where the third item 406 is to be retrieved. The CS 110 may identify the second operation zone 402b based on item characteristics of the third item 406 (e.g., dimensions of the third item 406 and/or a weight of the third item 406) and a location where the third item 406 is stored at present. Since the third item 406 is stored on the second shelf 206 of the first storage unit 202, the second operation zone 402b may encompass the second shelf 206 of the first storage unit 202. The second operation zone 402b is of length 'd1' (i.e., length of the second shelf 206) and a breadth 'd3' (i.e., a breadth of the second shelf 206). Further, as the second shelf 206 is at a height 'h6' from the floor level 228, the second operation zone 402b is at the height 'h6' from the floor level 228.

FIG. 4C is a block diagram of an exemplary scenario 408 that describes a method for identifying an operation zone of a storage unit, in accordance with another embodiment of the present disclosure. The scenario 408 involves the transport vehicle 108, the CS 110, and the first storage unit 202.

The CS 110 may receive a third service request, which is an item placement request, from the external communication server. Based on the third service request, the CS 110 may determine that a fourth item has to be placed in the storage area 104. The CS 110 may identify, from the plurality of storage units in the storage area 104, a second set of storage units that is associated with the fourth item. After identifying the second set of storage units, the CS 110 may select a storage unit from the second set of storage units for storing the fourth item. In a non-limiting example, it is assumed that the CS 110 selects the first storage unit 202 for storing the fourth item. Hereinafter, the placement of the fourth item in the first storage unit 202 is referred to as 'a third operation'. The CS 110 may identify a third operation zone 402c for performing the third operation, based on item characteristics of the fourth item and the characteristics of the first storage unit 202. In one exemplary scenario, the CS 110 may determine that the fourth item may be placed on a portion of the fourth shelf 210 that is to a right of the third partition 216 to maintain the center of gravity of the first storage unit 202. In such a scenario, the third operation zone 402c may lie between the fourth shelf 210 and the third shelf 208 and may encompass the portion of the fourth shelf 210 that is to the right of the third partition 216. The third operation zone 402c may be of length 'd4' (i.e., distance between the third partition 216 and a right sidewall of the first storage unit 202) and breadth 'd5' (i.e., breadth of the fourth shelf 210). Since the fourth shelf 210 is at a height 'h7' from the floor level 228, the third operation zone 402c is at the height 'h7' from the floor level 228.

Thus, the CS 110 may identify different operation zones (e.g., the first through third operation zones 402a-402c) for different service requests (e.g., the first through third service requests) based on item characteristics of items associated with the corresponding service request and characteristics of a storage unit identified by the CS 110 for the corresponding service request.

FIG. 5A is an exemplary Table 500A that illustrates information of the first through third operators 118a-118c maintained at the CS 110 at a first time-instance (i.e., at $t=t_0$), in accordance with an embodiment of the present disclosure. Table 500A includes first through sixth columns 502a-502f (hereinafter, the first through sixth columns 502a-502f are referred to as 'the columns 502a-502f') and first through third rows 504a-504c (hereinafter, the first through third rows 504a-504c are referred to as 'the rows 504a-504c').

Table 500A may be stored in the memory of the CS 110. Table 500A is indicative of operator names and physical characteristics of various operators (e.g., the first through third operators 118a-118c) in the storage facility 102. The columns 502a-502f are indicative of an operator name, an age, a gender, a height, a current fatigue level (i.e., the fatigue level at $t=t_0$), and a medical condition (i.e., the medical condition at $t=t_0$) of the first through third operators 118a-118c. The row 504a indicates that the first operator 118a named 'John Doe' is a male of 24 years having a height of 1.9 meters (m). The row 504a further indicates that the first operator 118a 'John Doe' has a current fatigue level of '1' and is healthy. The row 504b indicates that the second operator 118b named 'Jane Doe' is a female of 43 years having a height of 1.6 m. The row 504b further indicates that the second operator 118b 'Jane Doe' has a current fatigue level of '1' and is healthy. The row 504c indicates that the third operator 118c named 'Mark Smith' is a male of 59 years having a height 1.4 m. The row 504c further indicates that the third operator 118c 'Mark Smith' has a current fatigue level of '1' and is healthy.

Table 500A is indicative of both static information and dynamic information pertaining to each operator 118a-118c. The static information represents those characteristics of the first through third operators 118a-118c that are constant and includes the columns 502a-502d, while the dynamic information represents those characteristics of the first through third operators 118a-118c that vary with time and includes the columns 502e and 502f. The dynamic information included in Table 500A corresponds to the first time-instance (i.e., $t=t_0$). In one exemplary scenario, the first time-instance (i.e., $t=t_0$) may be a starting time of a work shift of the first through third operators 118a-118c in the storage facility 102. The CS 110 may determine the current fatigue levels of the first through third operators 118a-118c based on a number of operations performed by each operator 118a-118c within a specified time period, a feedback from each operator 118a-118c, gesture recognition of each operator 118a-118c, or the like.

In one exemplary scenario, the CS 110 may have stored in the memory of the CS 110, information indicative of a mapping between fatigue levels and feedback of the first through third operators 118a-118c and gestures of the first through third operators 118a-118c. The CS 110 may determine a number of operations performed by the first operator 118a within the specified time period and may record the gestures of the first operator 118a by way of a live camera feed. The CS 110 may further request the first operator 118a to manually select a current fatigue level (i.e., the feedback) from a list of fatigue levels that may be displayed on a first screen of the first operator device of the first operator 118a. Based on the recorded gestures and the received feedback, the CS 110 may determine the current fatigue level of the first operator 118a. For example, the CS 110 may employ a gesture recognition software that allows the CS 110 to match the recorded gestures with standard gestures that may be stored in the memory of the CS 110. The standard gestures are known gestures (e.g., slouching, or the like) that indicate various fatigue levels. For example, an operator is considered tired when the operator starts slouching. A match between the recorded gestures and one of the standard gestures may enable the CS 110 to determine the current fatigue level of the first operator 118a. In a non-limiting example, the current fatigue level of each operator 118a-118c may lie within a range of '1-10', where '1' indicates a lowest level of fatigue and '10' indicates exhaustion. As shown in Table 500A, the fatigue level of each operator 118a-118c at the first time-instance (i.e., at $t=t_0$) is '1'. The fatigue level of each operator 118a-118c may change as the work shift progresses. Thus, the CS 110 may periodically determine the number of operations performed by each operator 118a-118c in the specified time period and record the gestures of each operator 118a-118c for updating the fatigue level of each operator 118a-118c in Table 500A.

The fatigue level may further depend upon various other factors in which various algorithms may be applied to deduce the current fatigue level. In one example, determination of the fatigue level may be performed by dynamically plotting an operator's performance against the time of day, number of work hours or the environmental conditions. In another example, the fatigue level may be determined or traced backwards by putting one or more known values of external conditions in the formula. In other examples, the fatigue level may include benchmarking the performance only to the number of work hours without break against similar demographic workforce. The fatigue level may further take into consideration the variance of performance of an operator during the day or a day an operator is unwell.

The CS 110 may display a list of medical conditions (e.g., 'healthy' or 'unwell') on each operator device, requesting the corresponding operators 118a-118c to select a corresponding medical condition and a reason to justify the medical condition. As shown in Table 500A, the first through third operators 118a-118c are healthy. In another embodiment, one or more biometric sensors (e.g., heart rate monitor, blood pressure monitor, body temperature monitor, breath rate monitor, or the like) may be utilized to detect the medical condition and the fatigue level of each operator 118a-118c. It will be apparent to those of skill in the art that Table 500A is merely exemplary and may, in another embodiment, include additional information such as a 'strength level' of each operator 118a-118c, or the like.

FIG. 5B is a table 500B that illustrates updated information of the first through third operators 118a-118c maintained at the CS 110 at a second time-instance (i.e., at $t=t_1$), in accordance with an embodiment of the present disclosure. Table 500B includes the columns 502a-502f and the rows 504a-504c. The second time-instance (i.e., $t=t_1$) may be any time instance, after the first time-instance at $t=t_0$, during the work shift.

Since the columns 502a-502d indicate the static information of the first through third operators 118a-118c, the values in the columns 502a-502d of Table 500B are the same as the values in columns 502a-502d of Table 500A. The column 502e indicates the dynamic information, which is a function of time, of the first through third operators 118a-118c. Thus, the values in the column 502e of Table 500B are different from the values in the column 502e of Table 500A. For example, at $t=t_1$, the CS 110 may determine that the fatigue levels of the first through third operators 118a-118c are '7', '2', and '4', respectively, which are different from the fatigue levels of the first through third operators at $t=t_0$. The column 502f also indicates the dynamic information of the first through third operators 118a-118c. Thus, the medical condition of the second operator 118b indicated by the row 504b of Table 500B is different from the medical condition of the second operator 118b indicated by the row 504b of Table 500A. The CS 110 may allow each operator 118a-118c to report a corresponding medical condition by way of the corresponding operator device. For example, at the second time-instance (i.e., $t=t_1$), the second operator 118b may report a medical condition (e.g., a joint ache) that is detrimental to a task of the second operator 118b by way of the corresponding operator device. Thus, at the second time-instance (i.e., $t=t_1$), the CS 110 may update the medical condition of the second operator 118b (i.e., Jane Doe) in Table 500B to indicate that the second operator 118b is 'unwell'. As further shown in Table 500B, the first and third operators 118a and 118c are 'healthy' at the second time-instance (i.e., $t=t_1$). In other words, the medical conditions of the first and second operators 118a and 118c have remained unchanged between the first and second time-instances. It will be apparent to a person of skill in the art that the fatigue level and the medical conditions are two different dynamic parameters. For example, at any given point of time, an operator may be unwell in spite of not being tired (i.e., the fatigue level may be '1'). Likewise, another operator may have a very high fatigue level, e.g., '8', in spite of being healthy.

The CS 110 may utilize Tables 500A and 500B to determine the activity zones of the first through third operators 118a-118c at the first and second time-instances, respectively. The determination of the activity zones is described in detail in conjunction with FIGS. 6A-6C.

Figure 6A:
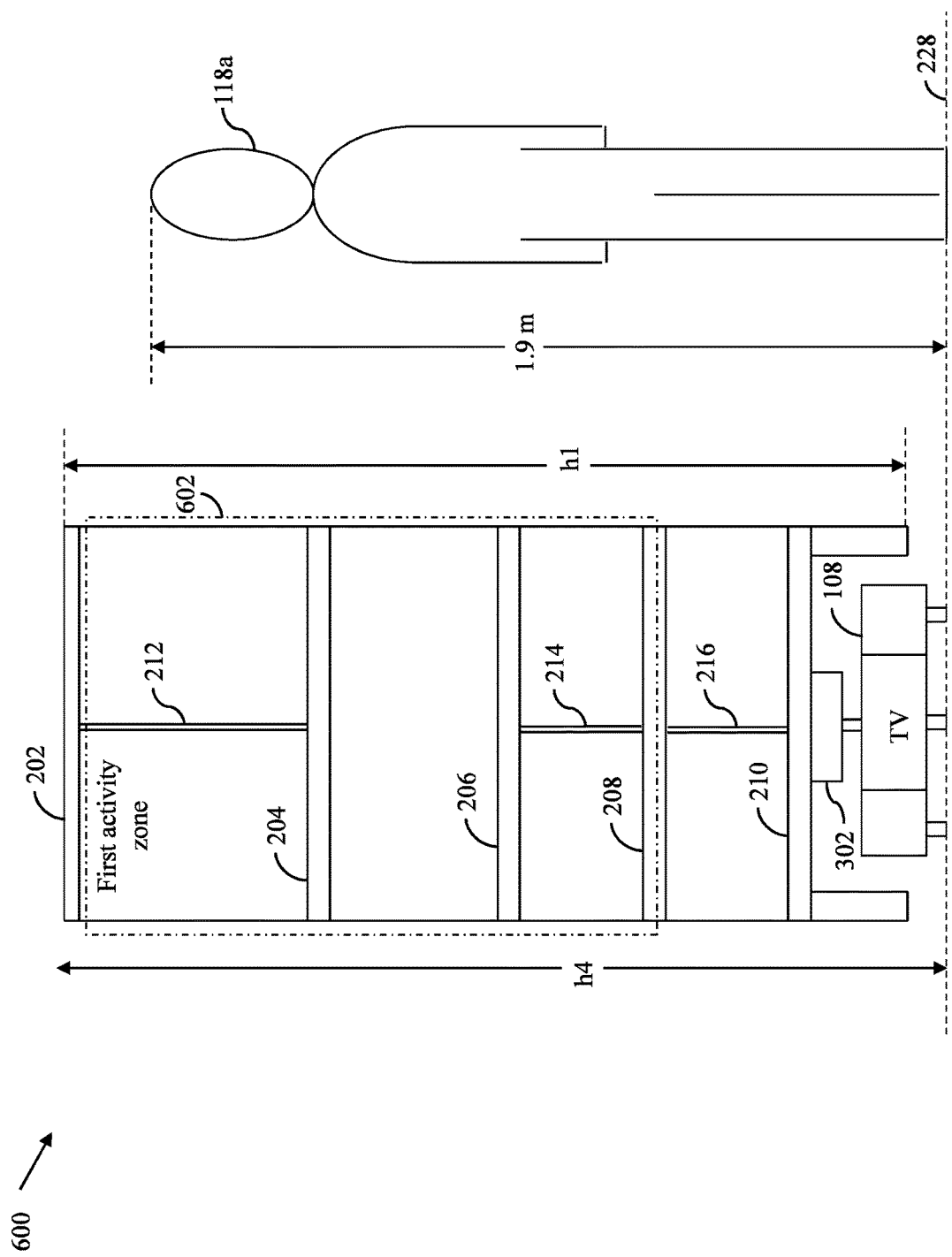
FIG. 6A is a block diagram of an exemplary scenario that describes a method for determining a first activity zone of the first operator, in accordance with an embodiment of the present disclosure.

FIG. 6A is a block diagram of an exemplary scenario 600 that describes a method for determining a first activity zone 602 of the first operator 118a, in accordance with an embodiment of the present disclosure. The scenario 600 involves the CS 110, the transport vehicle 108, the first storage unit 202, and the first operator 118a.

The CS 110 may have received the first service request for storing the first and second items in the storage facility 102 and the CS 110 may have selected the first storage unit 202 for storing the first and second items (as described in FIG. 4A). The CS 110 may be further configured to determine an activity zone of each operator 118a-118c for the first service request. In other words, the CS 110 may be configured to determine an activity zone of each operator 118a-118c for performing the first operation (i.e., placing the first and second items in the first storage unit 202).

For determining the first activity zone 602 for the first operator 118a corresponding to the first storage unit 202, the CS 110 may retrieve information pertaining to the item characteristics (e.g., the weights, the dimensions, or the types) of the first and second items, the physical characteristics of the first operator 118a at a current time-instance, characteristics of the first PPS 218 allocated to the first operator 118a, historical data of the first operator 118a, or the like. In one example, the CS 110 may refer to the inventory storage data stored in the memory of the CS 110 for retrieving the item characteristics of the first and second items. In another example, the first service request may include the item characteristics of the first and second items. The CS 110 may retrieve the information of the operators 118a-118c stored in the memory of the CS 110 for the current time-instance. In a non-limiting example, it is assumed that the current time-instance is $t=t_0$, thus, the CS 110 refers to Table 500A stored in the memory of the CS 110 for retrieving the information pertaining to the physical characteristics of the first operator 118a. The CS 110 may further retrieve the information pertaining to the characteristics (e.g., dimensions of the first PPS 218, dimensions of the first and second PPS shelves 220 and 222, heights of the first and second PPS shelves 220 and 222 from the floor level 228) of the first PPS 218 from the memory of the CS 110. The historical data of the first operator 118a may be retrieved from the memory of the CS 110. The historical data of the first operator 118a may be indicative of information such as, but limited to, favorable regions (i.e., regions of the first storage unit 202 associated with maximum efficiency) of operation for the first operator 118a, unfavorable regions (i.e., regions of the first storage unit 202 associated with minimum efficiency) of operation for the first operator 118a, work preferences of the first operator 118a, or the like. In one exemplary scenario, the first operator 118a may possess a first platform to enhance access to the first storage unit 202. In other words, the first platform may augment the height of the first operator 118a. In such a scenario, the CS 110 may retrieve information pertaining to characteristics (e.g., a height of the first platform) of the first platform as well from the memory of the CS 110.

Based on the height of the first operator 118a as indicated by Table 500A, the CS 110 may further determine a first reach zone of the first operator 118a. The first reach zone may indicate a region of the first storage unit 202 that may be accessed by the first operator 118a without hindrance. In other words, the first reach zone of the first operator 118a is a function of the static information (e.g., age, gender, and height) associated with the first operator 118a. In this scenario, the first reach zone of the first operator 118a may encompass the first through fourth shelves 204-210 of the first storage unit 202. The first activity zone 602 may be a function of the historical data of the first operator 118a, the first reach zone, the dynamic information associated with the first operator 118a, the item characteristics of the first and second items, the characteristics of the first PPS 218, or the like. As shown in FIG. 6A, the first activity zone 602 determined by the CS 110 encompasses the first through third shelves 204-208 of the first storage unit 202. It will be apparent to a person of ordinary skill in the art that the first activity zone 602 is shown for illustrative purposes and should not be construed to limit the scope of the disclosure.

In another example, when the current fatigue level of the first operator 118a is '1' (i.e., the lowest fatigue level) and the first operator 118a is healthy, the first activity zone 602 may be same as the first reach zone. In another example, if the current fatigue level of the first operator 118a is '7', the first activity zone 602 may be smaller than the first reach zone and may lie in such a region of the first storage unit 202 for which the first operator 118a does not require to bend below a first threshold level. In another example, if the first and second items are heavy, the first activity zone 602 may be smaller than the first reach zone and may lie in such a region of the first storage unit 202 for which the first operator 118a does not require to bend below a second threshold level or lift the first and second items above a third threshold level. In another example, the first operator 118a may have the current fatigue level as '5' and the first and second items may be held at the second PPS shelf 222. In such a scenario, the CS 110 may determine the first activity zone 602 in such a manner that the first activity zone 602 is at a height that is similar to the height of the second PPS shelf 222 from the floor level 228. In other words, the first activity zone 602 may have a negative correlation with the weight of the first and second items, the current fatigue level of the first operator 118a, and the medical condition of the first operator 118a. Thus, a size of the first activity zone 602 may be negatively affected by an increase in the weights and/or sizes of the items to be placed or retrieved, an increase in the current fatigue level of the first operator 118a, and/or any medical condition of the first operator 118a that may hamper any operation performed by the first operator 118a. It will be apparent to a person of ordinary skill in the art that the abovementioned examples are for illustrative purposes and should not be construed to limit the scope of the disclosure.

Figure 6B:
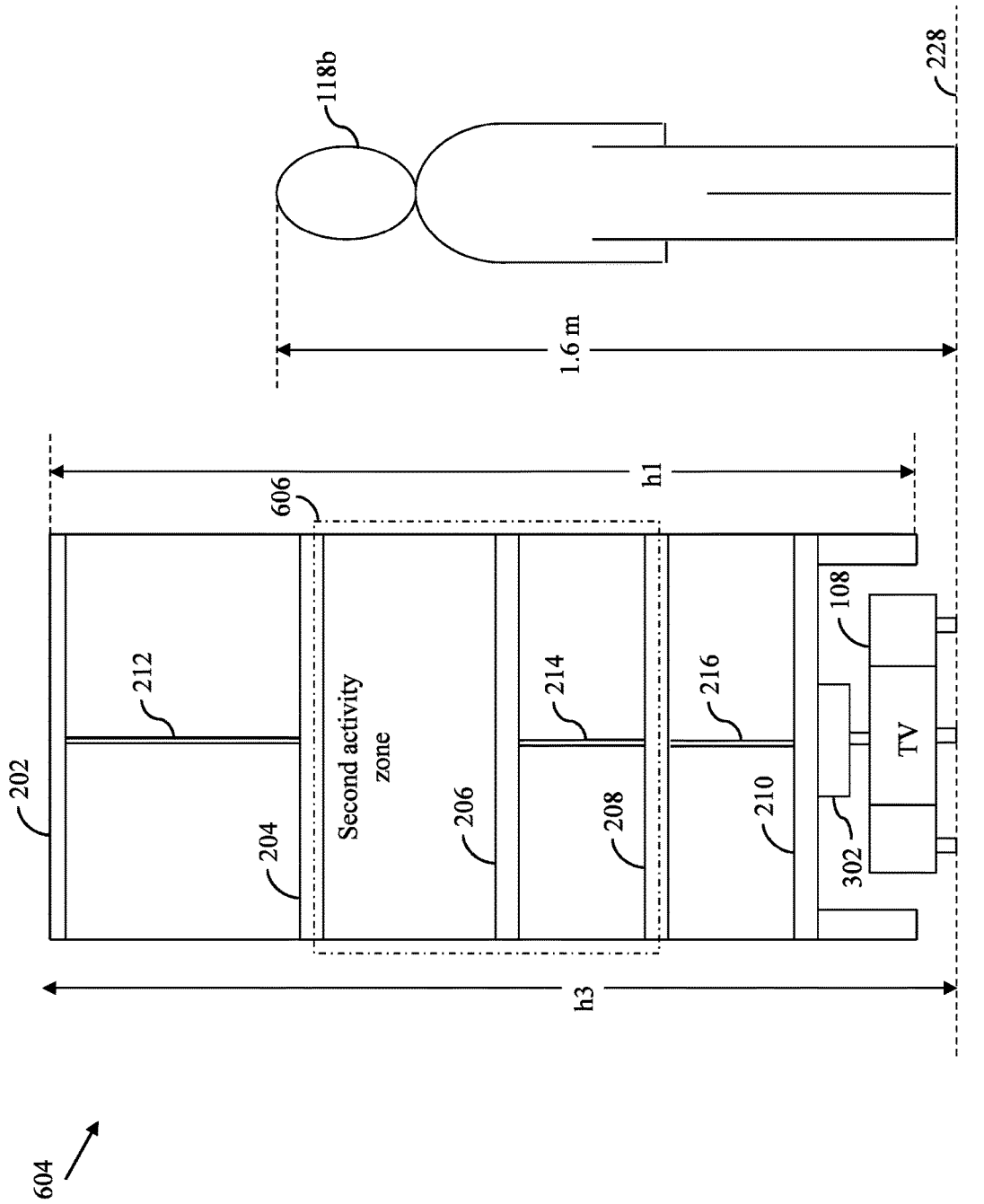
FIG. 6B is a block diagram of an exemplary scenario that describes a method for determining a second activity zone of the second operator, in accordance with an embodiment of the present disclosure.

FIG. 6B is a block diagram of an exemplary scenario 604 that describes a method for determining a second activity zone 606 of the second operator 118b, in accordance with an embodiment of the present disclosure. The exemplary scenario 604 involves the transport vehicle 108, the CS 110, the first storage unit 202, and the second operator 118b. The exemplary scenario 604 illustrates the second activity zone 606 of the second operator 118b as determined by the CS 110 for performing the first operation (i.e., placing the first and second items in the first storage unit 202) at the first time-instance (i.e., at $t=t_0$).

The CS 110 may determine the second activity zone 606 based on the historical data of the second operator 118b, a second reach zone of the second operator 118b, the dynamic information associated with the second operator 118b, the item characteristics of the first and second items, the characteristics of the second PPS, or the like. In a non-limiting example, the second activity zone 606 determined by the CS 110 may encompass the second and third shelves 206 and 208 of the first storage unit 202. It will be apparent to those of skill in the art that the CS 110 may determine the second activity zone 606 in a manner that is similar to the determination of the first activity zone 602 as described in FIG. 6A. Further, unlike the first activity zone 602 of the first operator 118a, the second activity zone 606 may not encompass the first shelf 204 of the first storage unit 202.

Figure 6C:
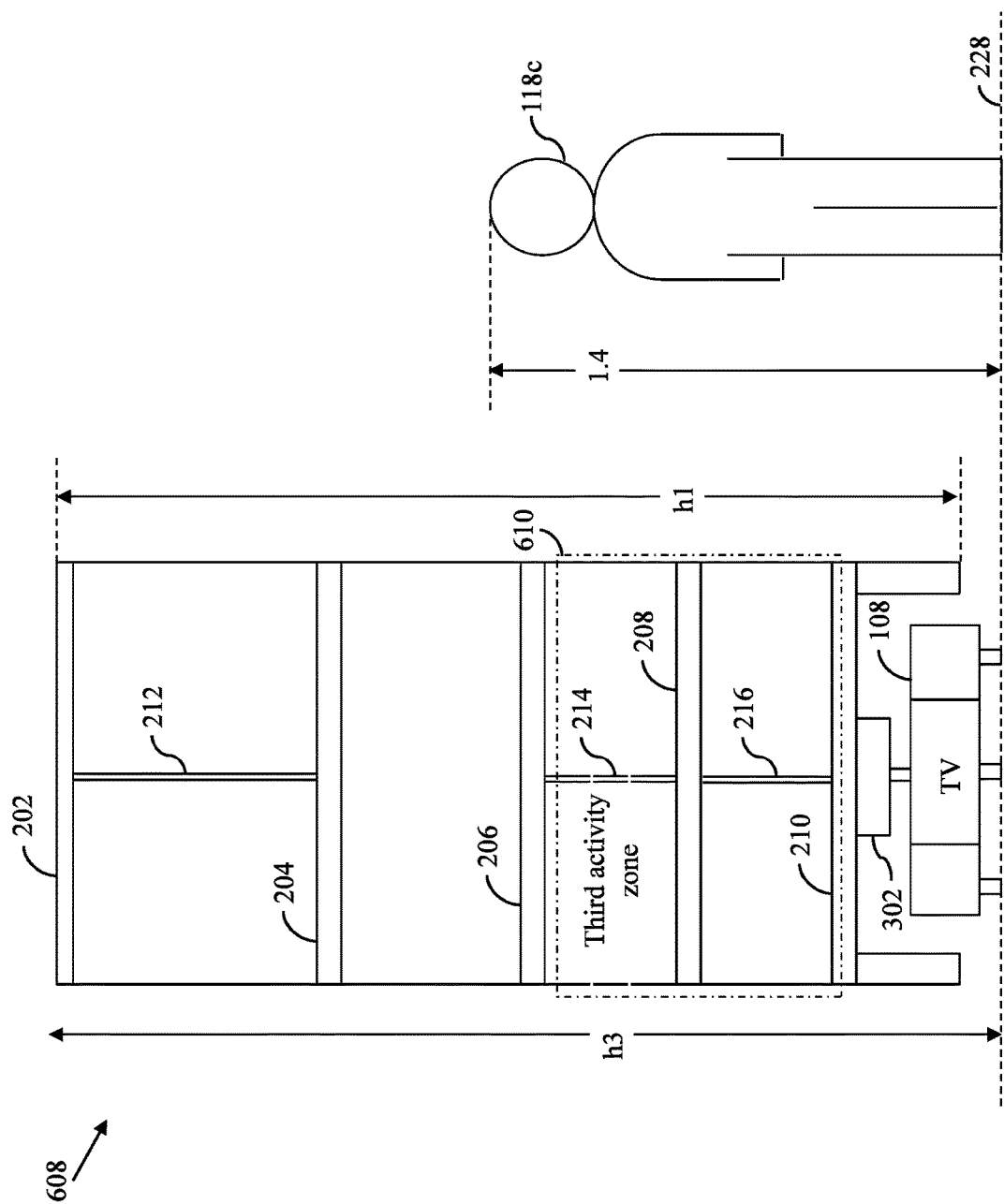
FIG. 6C is a block diagram of an exemplary scenario that describes a method for determining a third activity zone of the third operator, in accordance with an embodiment of the present disclosure.

FIG. 6C is a block diagram of an exemplary scenario 608 that describes a method for determining a third activity zone 610 of the third operator 118c, in accordance with an embodiment of the present disclosure. The exemplary scenario 608 involves the transport vehicle 108, the CS 110, the first storage unit 202, and the third operator 118c. The exemplary scenario 608 illustrates the third activity zone 610 of the third operator 118c as determined by the CS 110 for performing the first operation (i.e., placing the first and second items in the first storage unit 202) at the first time-instance (i.e., at $t=t_0$).

The CS 110 may determine the third activity zone 610 based on the historical data of the third operator 118c, a third reach zone of the third operator 118c, the dynamic information associated with the third operator 118c, the item characteristics of the first and second items, the characteristics of the third PPS, or the like. In a non-limiting example, the third activity zone 610 determined by the CS 110 may encompass the third and fourth shelves 208 and 210 of the first storage unit 202. It will be apparent to those of skill in the art that the CS 110 may determine the third activity zone 610 in a manner that is similar to the determination of the first and second activity zones 602 and 606 as described in FIGS. 6A and 6B. Further, unlike the first activity zone 602 of the first operator 118a, the third activity zone 610 may not encompass the first and second shelves 204 and 206.

Thus, for a same operation (e.g., the first operation), activity zones (e.g., the first through third activity zones 602, 606, and 610) may be different for different operators (e.g., the first through third operators 118a-118c) and are based on physical characteristics of the corresponding operator (as shown in FIGS. 6A-6C).

Figure 7:
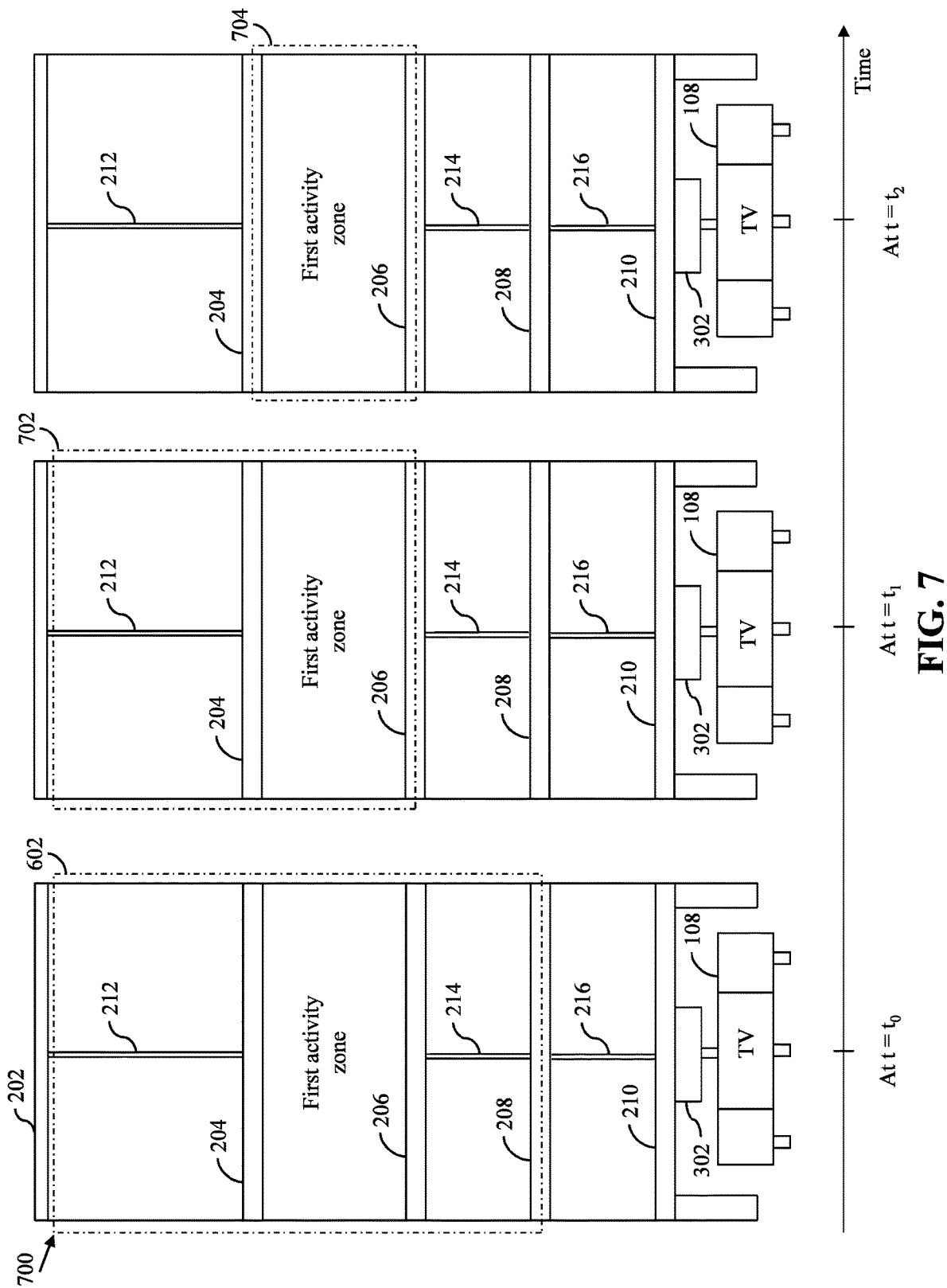
FIG. 7 is a block diagram of an exemplary scenario that illustrates a relationship between an activity zone and a fatigue level of an operator in the storage facility, in accordance with an embodiment of the present disclosure.

FIG. 7 is block diagram of an exemplary scenario 700 that illustrates a relationship between an activity zone and a fatigue level of an operator in the storage facility 102, in accordance with an embodiment of the present disclosure. The exemplary scenario 700 involves the transport vehicle 108 and the first storage unit 202. The CS 110 may receive the first service request for storing the first and second items in the storage facility 102. Based on the first service request, the CS 110 may select the first storage unit 202 for storing the first and second items.

In a scenario when the first service request is received at the first time-instance (i.e., at $t=t_0$) and the current fatigue level of the first operator 118a is '1', the first activity zone 602 as determined by the CS 110 may encompass the first through third shelves 204-208.

In another scenario, the first service request may be received at the second time-instance (i.e., at $t=t_1$). Due to working in the storage facility 102, the current fatigue level of the first operator 118a may have increased from '1' to '7' at the second time-instance (i.e., at $t=t_1$). Thus, when the CS 110 determines a first activity zone 702 at the second time-instance (i.e., at $t=t_1$) for the first service request, the first activity zone 702 may encompass the first and second shelves 204 and 206. The first activity zone 702 at the second time-instance (i.e., at $t=t_1$) is smaller than the first activity zone 602 at the first time-instance (i.e., at $t=t_0$) as the current fatigue level of the first operator 118a is higher at the second time-instance (i.e., at $t=t_1$). The first activity zone 702 at the second time-instance (i.e., at $t=t_1$) does not encompass the third and fourth shelves 208 and 210, as reaching out to the third and fourth shelves 208 and 210 may involve excessive bending by the first operator 118a and may cause discomfort to the first operator 118a, who already has the current fatigue level of '7'.

In another scenario the first service request may be received at a third time-instance (i.e., at $t=t_2$). The third time-instance (i.e., at $t=t_2$) may be after the second time-instance (i.e., at $t=t_1$) and a current fatigue level of the first operator 118a at the third time-instance (i.e., at $t=t_2$) may be greater than '7'. Thus, when the CS 110 determines a first activity zone 704 at the third time-instance (i.e., at $t=t_2$) for the first service request, the first activity zone 704 may encompass only the second shelf 206. As described in the foregoing, the first activity zone (e.g., the first activity zones 602, 702, and 704) has a negative correlation with the current fatigue level of the first operator 118a and may vary throughout the work shift as the current fatigue level of the first operator 118a varies. It will be apparent to those of skill in the art that the abovementioned exemplary scenario is for illustrative purpose and should not be construed to limit the scope of the disclosure.

Figure 8A:
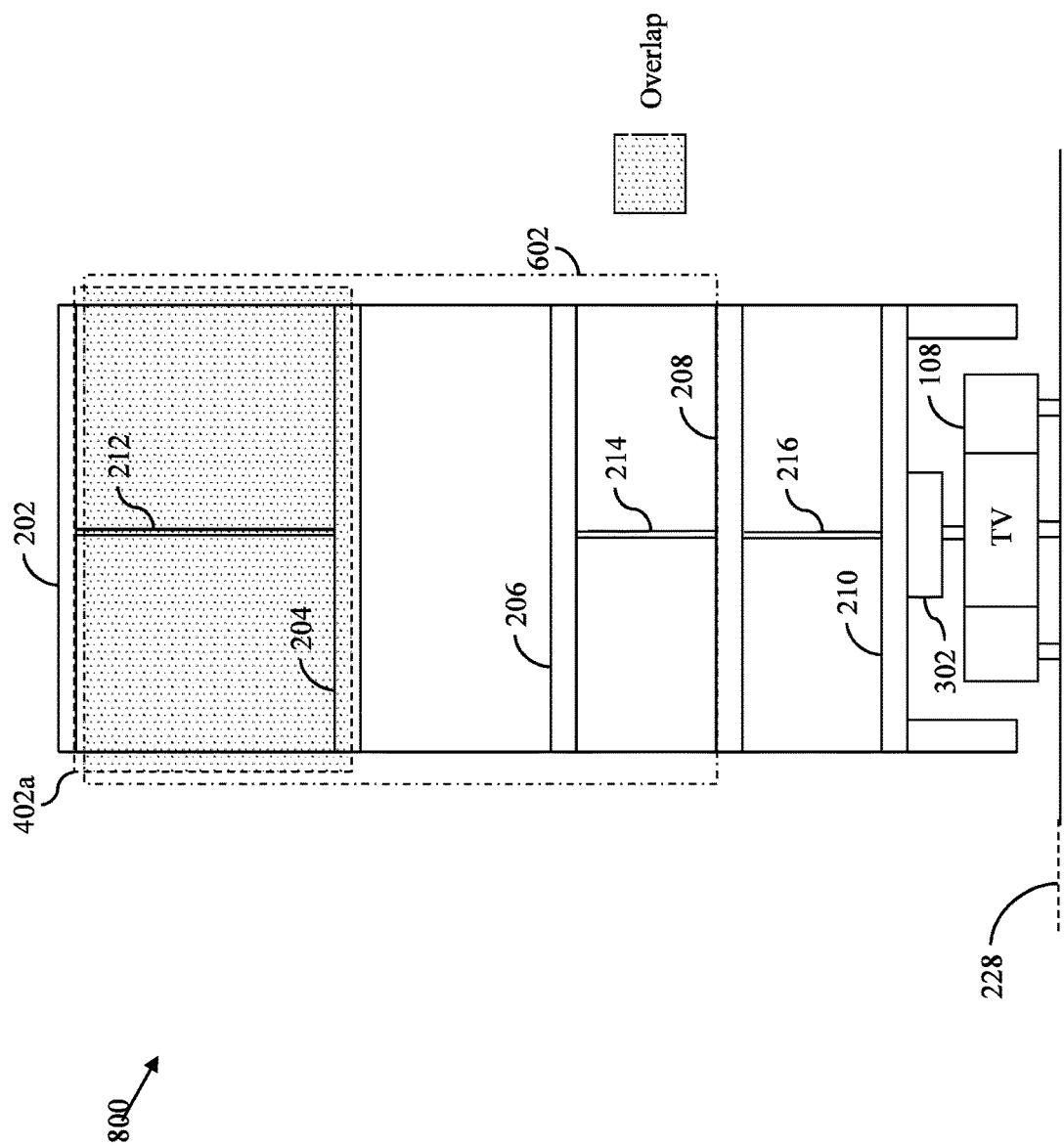
FIG. 8A is a block diagram of an exemplary scenario that describes a method for allocating a storage unit to an operator for performing an operation in the storage facility, in accordance with an embodiment of the present disclosure.

FIG. 8A is a block diagram of an exemplary scenario 800 that describes a method for allocating a storage unit to an operator for performing an operation in the storage facility 102, in accordance with an embodiment of the present disclosure. The exemplary scenario 800 involves the transport vehicle 108, the CS 110, and the first storage unit 202. FIG. 8A is described in conjunction with FIGS. 4A, and 6A-6C.

After determining the first operation zone 402a for the first service request and the first through third activity zones 602, 606, and 610 of the first through third operators 118a-118c, respectively, the CS 110 may determine first through third ergonomic scores for the first through third operators 118a-118c for performing the first operation. The exemplary scenario 800 illustrates the determination of the first ergonomic score for the first operator 118a for performing the first operation (i.e., placing the first and second items in the first storage unit 202).

For determining first ergonomic score, the CS 110 may identify an overlap between the first operation zone 402a and the first activity zone 602. In FIG. 8A, the overlap between the first operation zone 402a and the first activity zone 602 is indicated by the shaded portion. As the first operation zone 402a is included within the first activity zone 602, the overlap between the first operation zone 402a and the first activity zone 602 is '100%'. In a non-limiting example, the first ergonomic score may be expressed as an absolute number. In another embodiment, the first ergonomic score may be expressed as a percentage and may be equal to the overlap between the first operation zone 402a and the first activity zone 602. For example, if a defined range for an ergonomic score is '0-100', the CS 110 may determine that the first ergonomic score is equal to '100' based on the '100%' overlap between the first operation zone 402a and the first activity zone 602. It will be apparent to a person of skill in the art that since the determination of the first ergonomic score is based on the first activity zone 602 which is dependent on the current fatigue level of the first operator 118a, the first ergonomic score is dynamic in nature and may vary as the work shift progresses. In another embodiment, the ergonomic score may be expressed as a specific category of a set of categories (e.g., 'Category A', 'Category B', 'Category C', or 'Category D'. Each category in the set of categories may correspond to a degree of overlap between the first operation zone 402a and the first activity zone 602. For example, 'Category A' may correspond to an overlap of '0-25%' between the first operation zone 402a and the first activity zone 602. 'Category B' may correspond to an overlap of '26-50%' between the first operation zone 402a and the first activity zone 602. Similarly, 'Category C' may correspond to an overlap of '51-75%' and 'Category D' may correspond to an overlap of '76-100%'. Thus, in a scenario, where the overlap between the first operation zone 402a and the first activity zone 602 is '100%', the CS 110 may determine that the first ergonomic score corresponds to 'Category D'.

It will be apparent to those of skill in the art that determination of second and third ergonomic scores for the second and third operators 118b and 118c for performing the first operation may be similar to the determination of the first ergonomic score. As shown in FIGS. 6B and 6C, the second and third activity zones 606 and 610 do not encompass the first shelf 204. Therefore, the CS 110 may identify that the second and third activity zones 606 and 610 do not overlap with the first operation zone 402a and thus, the CS 110 may determine that the second and third ergonomic scores are equal to '0'.

Based on the first, second, and third ergonomic scores, the CS 110 may allocate the first storage unit 202 to the first operator 118a for performing the first operation (i.e., placing the first and second items in the first storage unit 202). In other words, as the first operator 118a has the highest ergonomic score, the CS 110 may allocate the first storage unit 202 to the first operator 118a for performing the first operation. Based on the allocation, the CS 110 may communicate commands to the first operator 118a on the first operator device, instructing the first operator 118a to perform the first operation. Further, the CS 110 may communicate commands to the transport vehicle 108, instructing the transport vehicle 108 to transport the first storage unit 202 to the first operator station 106a.

Figure 8B:
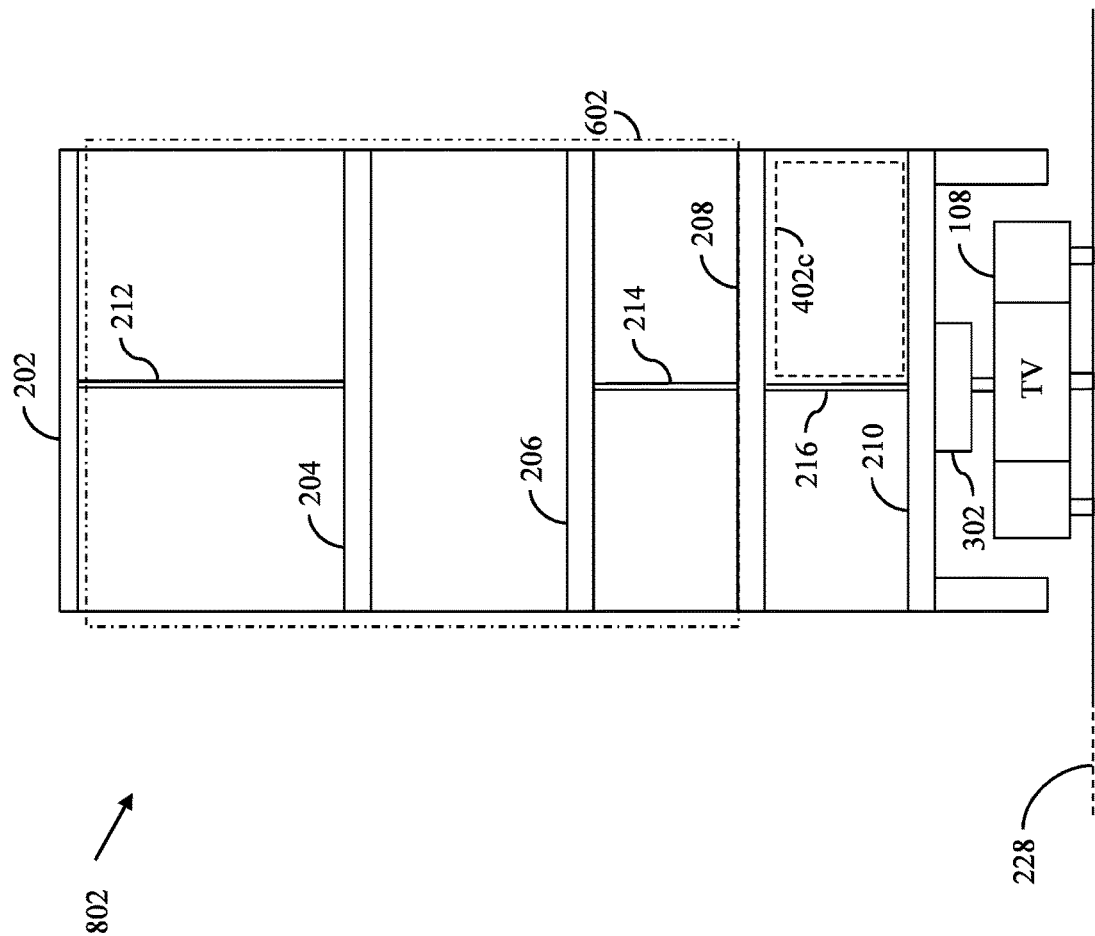
FIG. 8B is a block diagram of an exemplary scenario that describes a method for allocating a storage unit to an operator for performing an operation in the storage facility, in accordance with another embodiment of the present disclosure.

FIG. 8B is a block diagram of an exemplary scenario 802 that describes a method for allocating a storage unit to an operator for performing an operation in the storage facility 102, in accordance with another embodiment of the present disclosure. The scenario 802 involves the transport vehicle 108, the CS 110, and the first storage unit 202. FIG. 8B is described in conjunction with FIGS. 4C and 6A-6C.

After determining the third operation zone 402c for the third service request and the first through third activity zones 602, 606, and 610 of the first through third operators 118a-118c, respectively, the CS 110 may determine fourth through sixth ergonomic scores for the first through third operators 118a-118c for performing the third operation (i.e., placing the fourth item in the first storage unit 202). As the first activity zone 602 does not include the first operation zone 402a, the overlap between the third operation zone 402c and the first activity zone 602 is '0%'. Thus, if the defined range for an ergonomic score is '0-100', the CS 110 may determine that the fourth ergonomic score of the first operator 118a is equal to '0' based on the '0%' overlap between the third operation zone 402c and the first activity zone 602. As shown in FIG. 6B, the second activity zone 606 does not encompass the fourth shelf 210. Therefore, the CS 110 may determine that the fifth ergonomic score of the second operator 118b is '0'. As shown in FIG. 6C, the third activity zone 610 encompasses the fourth shelf 210. Thus, the third activity zone 610 includes the third operation zone 402c. In other words, there is a '100%' overlap between the third operation zone 402c and the third activity zone 610. The CS 110 may determine that the sixth ergonomic score is equal to '100' based on the '100%' overlap between the third operation zone 402c and the third activity zone 610. Based on the fourth through sixth ergonomic scores, the CS 110 may allocate the first storage unit 202 to the third operator 118c for performing the third operation (i.e., placing the fourth item in the third operation zone 402c of the first storage unit 202). Based on the allocation, the CS 110 may communicate commands to the third operator 118c on a third operator device of the third operator 118c, instructing the third operator 118c to perform the third operation. Further, the CS 110 may communicate commands to the transport vehicle 108, instructing the transport vehicle 108 to carry the first storage unit 202 to the third operator station 106c.

In another embodiment, based on historical data, the CS 110 may predict service requests that may be received by the CS 110 from the external communication server in future. Based on the prediction, the CS 110 may optimize allocation of operations (e.g., the first through third operations) or tasks to the first through third operators 118a-118c in such a manner that an average fatigue level of each operator is minimized and the throughput of the storage facility 102 is maximized.

FIG. 9 is a block diagram that illustrates the CS 110, in accordance with an embodiment of the present disclosure. The CS 110 includes a processor 902, a memory 904, and a transceiver 906 that communicate with each other by way of a first communication bus 908. The processor 902 includes an inventory manager 910, a request handler 912, a layout manager 914, and an allocation manager 916 that communicate with each other by way of a second communication bus 918. It will be apparent to a person having ordinary skill in the art that the CS 110 is for illustrative purposes and is not limited to any specific combination or hardware circuitry and/or software.

The processor 902 includes suitable logic, instructions, circuitry, interfaces, and/or codes for executing various operations, such as inventory or warehouse management operations, procurement operations, or the like. Examples of the processor 902 may include, but are not limited to, an application-specific integrated circuit (ASIC) processor, a reduced instruction set computing (RISC) processor, a complex instruction set computing (CISC) processor, a field-programmable gate array (FPGA), and the like. The processor 902 may be configured to perform identification of operation zones and activity zones, determination of ergonomic scores, and allocation of storage units to the first through third operators 118a-118c (as described in the foregoing descriptions of FIGS. 4A-4C, 6A-6C, and 8A-8B), for facilitating various operations (e.g., the first through third operations) in the storage facility 102.

The memory 904 includes suitable logic, instructions, circuitry, interfaces, and/or codes to store an inventory list 920, layout information 922, the inventory storage data (hereinafter, referred to as 'the inventory storage data 924'), transport vehicle data 926, and operator information 928. Examples of the memory 904 may include a random-access memory (RAM), a read-only memory (ROM), a removable storage drive, a hard disk drive (HDD), a flash memory, a solid-state memory, and the like. In one embodiment, the memory 904 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the memory 904 in the CS 110, as described herein. In other embodiments, the memory 904 may be realized in form of an external database server or a cloud storage working in conjunction with the CS 110, without departing from the scope of the disclosure.

The inventory list 920 includes a list of inventory items stored in the storage facility 102 and a number of units of each inventory item stored in the storage facility 102. The layout information 922 includes the virtual map of the storage facility 102. The virtual map may include information pertaining to the layout of the storage facility 102, such as the locations of the fiducial markers. The layout information 922 further includes an association between the fiducial markers and the racks 114 and the storage units (e.g., the first storage unit 202) that constitute the racks 114. The layout information 922 indicates real-time locations of the racks 114 and/or storage units (e.g., the first storage unit 202) based on the rack markers. The layout information 922 further includes real-time path availability information of various paths in the storage facility 102. For example, the layout information 922 may indicate that one or more paths (e.g., the aisles 116) are closed down for maintenance.

The inventory storage data 924 is indicative of associations between the inventory items and the storage units. The inventory storage data 924 includes details of the inventory items stored in each storage unit of the racks 114. As described in the foregoing, each storage unit and/or each rack 114 may be associated with a rack marker. Based on the inventory storage data 924, the CS 110 is aware of the storage locations of the inventory items stored in the storage units and the racks 114.

The transport vehicle data 926 is indicative of details of the transport vehicle 108. The details of the transport vehicle 108 may include a size, dimensions, a capacity, a maximum and minimum speed of the transport vehicle 108, or the like. The details may further include an identifier (e.g., a numeric or an alpha-numeric code) associated with the transport vehicle 108, real-time information such as a real-time location, an indicator that indicates whether the transport vehicle 108 is carrying a storage unit (e.g., the first storage unit 202), a weight of the storage unit, or the like. The operator information 928 is indicative of physical characteristics of the operators (e.g., the first through third operators 118a-118c) in the storage facility 102. For example, the operator information 928 may include Table 500A or Table 500B.

The transceiver 906 transmits and receives data over the communication network 112 using one or more communication network protocols. The transceiver 906 transmits various requests and messages to the transport vehicle 108 and the operator stations 106 and receives requests and messages from the transport vehicle 108 and the operator stations 106. Examples of the transceiver 906 include, but are not limited to, an antenna, a radio frequency transceiver, a wireless transceiver, a Bluetooth transceiver, an ethernet based transceiver, a universal serial bus (USB) transceiver, or any other device configured to transmit and receive data.

The processor 902 performs the inventory or warehouse management operations by way of the inventory manager 910, the request handler 912, the layout manager 914, and the allocation manager 916. The inventory manager 910 manages the inventory list 920 stored in the memory 904. For example, the inventory manager 910 adds new inventory items to the inventory list 920 when the new inventory items are stored in the storage area 104 and updates the inventory list 920 whenever there is any change in regards to the inventory items stored in the storage area 104 (e.g., when items are retrieved from storage unit for fulfilment of orders).

The request handler 912 processes all service requests (e.g., the first through third service requests) received from the external communication server. The request handler 912 identifies, based on the service requests received from the external communication server, inventory items pertinent to the service requests. The request handler 912 further identifies the storage units that store the inventory items associated with the requests. In one embodiment, the request handler 912 merges various service requests (e.g., the first and second service requests) to optimize fulfilment of the service requests.

The layout manager 914 manages the layout information 922. For example, if there is any change in the layout of the storage facility 102 (e.g., a change in the arrangement of the racks 114 or the storage units), the layout manager 914 updates the layout information 922 based on the change in the layout. The allocation manager 916 identifies operation zones (e.g., the first through third operation zones 402a-402c) based on the received service requests. Further, the allocation manager 916 identifies activity zones (e.g., the first through third activity zones 602, 606, and 610) of the operators (e.g., the first through third operators 118a-118c) in the storage facility 102. The allocation manager 916 determines ergonomic scores (e.g., the first through third ergonomic scores) of the first through third operators 118a-118c and allocates storage units to the first through third operators 118a-118c for performing corresponding operations, based on the ergonomic scores. The allocation manager 916 may further communicate commands to operator devices (e.g., the first operator device) and the transport vehicle 108, as described in the foregoing.

Though the processor 902 is depicted as a hardware component in FIG. 9, a person skilled in the art will appreciate that the scope of the disclosure is not limited to realizing the processor 902 as the hardware component. In another embodiment, the functionality of the processor 902 may be implemented by way of a computer executable code or a set of computer readable instructions stored in the memory 904, without deviating from the spirit of the disclosure.

Figure 10:
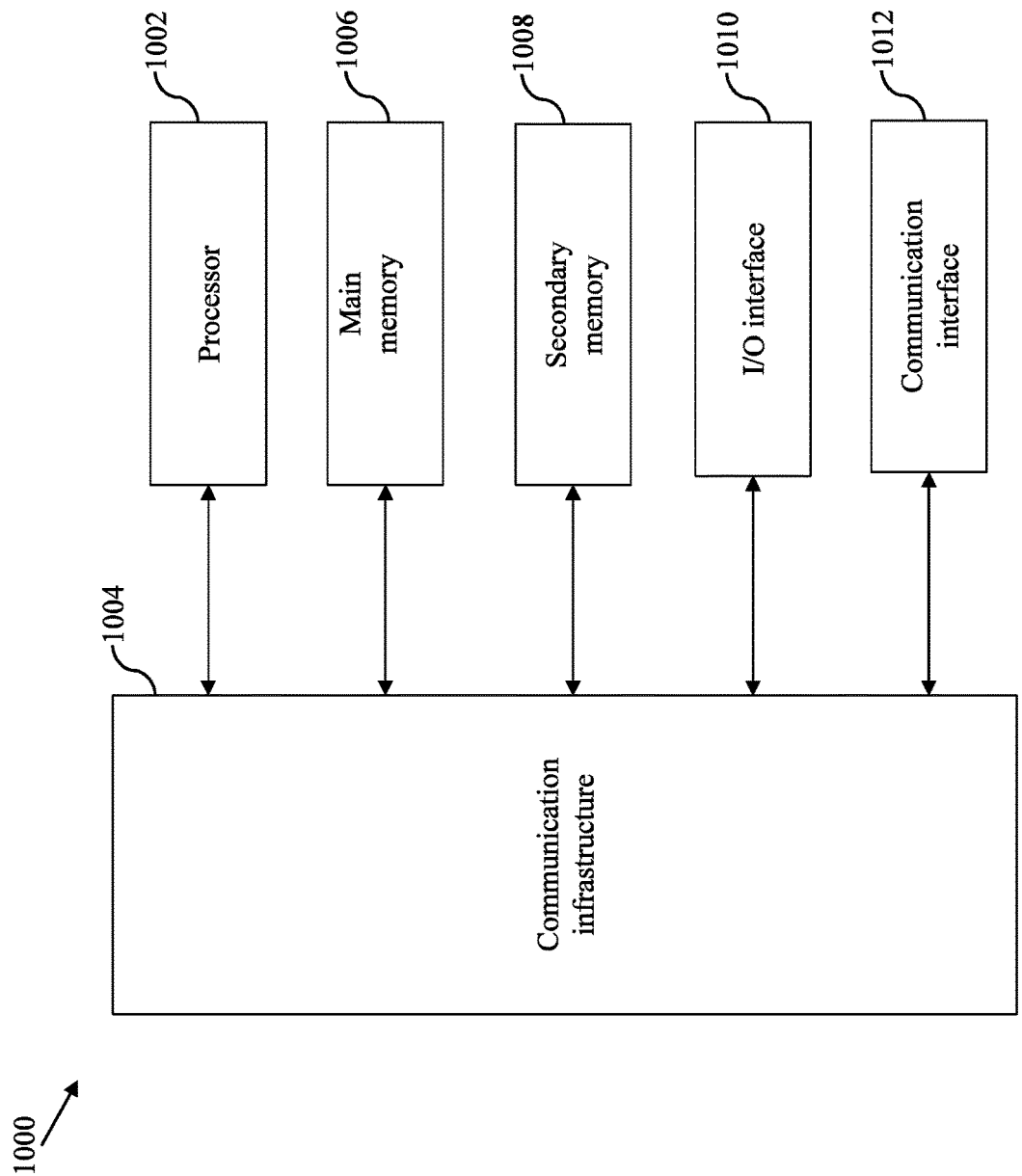
FIG. 10 is a block diagram that illustrates system architecture of a computer system, in accordance with an embodiment of the present disclosure.

FIG. 10 is a block diagram that illustrates system architecture of a computer system 1000, in accordance with an embodiment of the present disclosure. An embodiment of present disclosure, or portions thereof, may be implemented as computer readable code on the computer system 1000. In one example, the operator stations 106 and the transport vehicle 108 may be implemented in the computer system 1000. Hardware, software, or any combination thereof may embody modules and components used to implement methods of FIGS. 11A-11B. The computer system 1000 includes a processor 1002 that may be connected to a communication infrastructure 1004. The computer system 1000 may further include a main memory 1006 and a secondary memory 1008. The computer system 1000 further includes an input/output (I/O) interface 1010 and a communication interface 1012. The communication interface 1012 may allow data transfer between the computer system 1000 and various devices that are communicatively coupled to the computer system 1000.

Figure 11A:
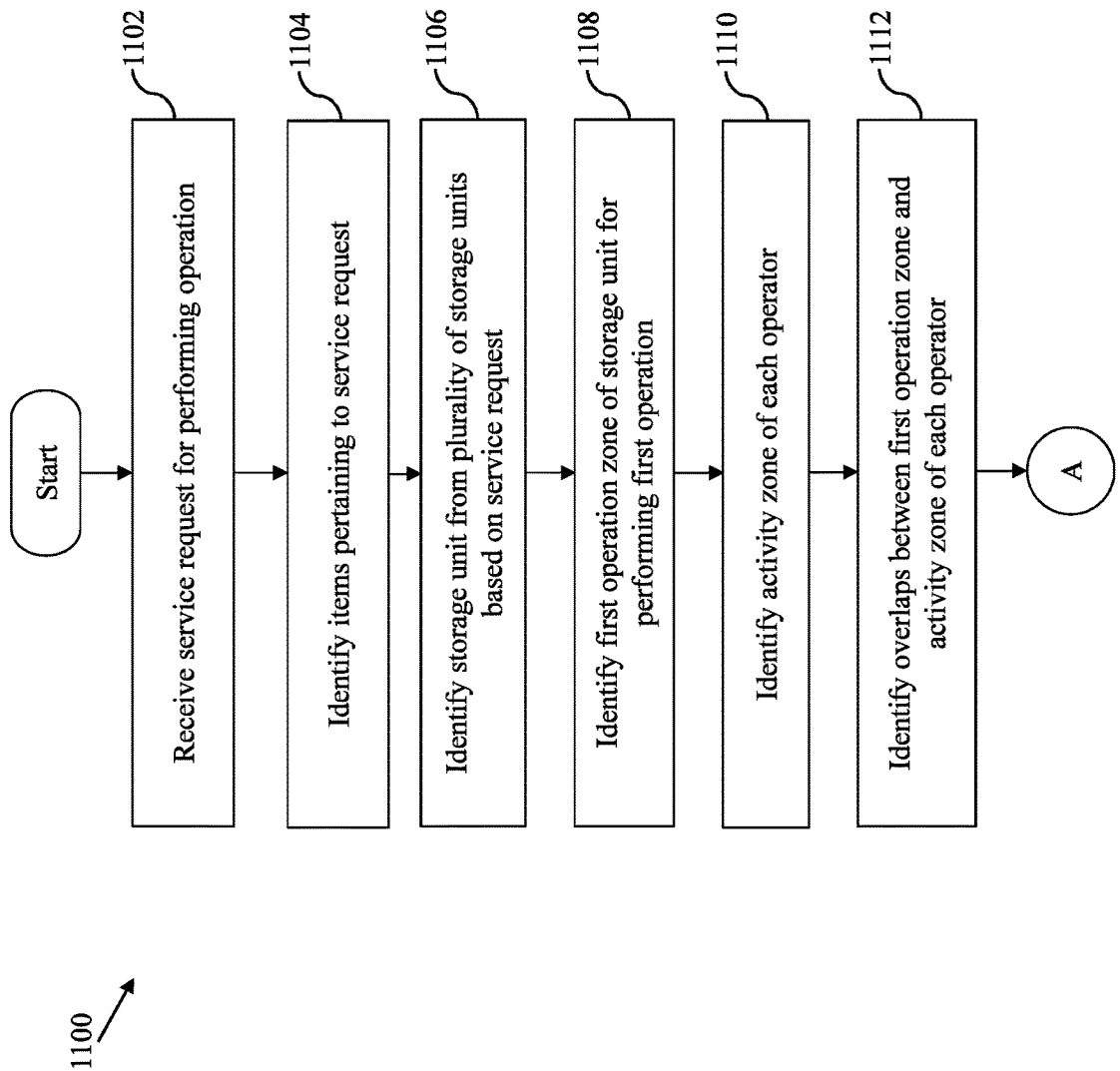

FIGS. 11A and 11B, collectively represent a flow chart 1100 that illustrates the method for facilitating one or more operations in the storage facility 102, in accordance with an embodiment of the present disclosure. FIGS. 11A and 11B are explained in conjunction with FIGS. 4A-4C, 5A, 5B, 6A-6C, 8A, and 8B.

At step 1102, the CS 110 receives a service request (e.g., the first service request) for performing an operation (e.g., the first operation) from the external communication server. At step 1104, the CS 110 identifies items (e.g., the first and second items) pertaining to the received service request. At step 1106, the CS 110 identifies a storage unit (e.g., the first storage unit 202) from the plurality of storage units in the storage facility 102, based on the service request and the inventory storage data 924. At step 1108, the CS 110 identifies an operation zone (e.g., the first operation zone 402a) of the identified storage unit for performing the operation. At step 1110, the CS 110 identifies an activity zone (e.g., the first through third activity zones 602, 606, and 610) of each operator 118a-118c (as described in the foregoing descriptions of FIGS. 6A-6C). At step 1112, the CS 110 identifies overlaps between the operation zone (e.g., the first operation zone 402a) and activity zone (e.g., the first through third activity zones 602, 606, and 610) of each operator 118a-118c. At step 1114, the CS 110 determines an ergonomic score for each operator 118a-118c for performing the operation, based on an overlap between the operation zone (e.g., the first operation zone 402a) and the corresponding activity zone (e.g., the first through third activity zones 602, 606, and 610). At step 1116, the CS 110 allocates the identified storage unit to an operator (e.g., the first operator 118a) with highest ergonomic score for performing the operation, based on the determined ergonomic scores of the first through third operators 118a-118c. In one example, the CS 110 may allocate the identified storage unit to the operator having the highest ergonomic score. At step 1118, the CS 110 communicates commands to the first operator device, instructing the first operator 118a to perform the operation. Further, the CS 110 communicates commands to the transport vehicle 108 for carrying the identified storage unit to an operator station (e.g., the first operator station 106a) of the operator having the highest ergonomic score.

The CS 110 facilitates various operations (e.g., placement of items or retrieval of items) in the storage facility 102. The CS 110 facilitates optimal allocation of tasks (e.g., first and third operations) to operators (e.g., the first through third operators 118a-118c). The optimal allocation of tasks to operators enhances a throughput of the storage facility 102, simultaneously improving convenience of the operators and reducing physical exertion by the operators. The enhancement in the throughput may also enable organizations to achieve desired business outcomes (e.g., reduced delivery time from storage facility to destination). The disclosure is flexible and scalable and can accommodate any number of operators, storage units, service requests, and/or transport vehicles. Furthermore, the disclosure can be implemented in any existing storage facility without introducing any infrastructural upgrades.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for facilitating one or more operations in a storage facility. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for facilitating one or more operations in a storage facility, the method comprising:
   receiving, by a server, a service request for performing a first operation in the storage facility;
   identifying, by the server, based on the service request, a first storage unit from a plurality of storage units in a storage area of the storage facility;
   identifying, by the server, an operation zone within the first storage unit for performing the first operation;
   determining, by the server, an activity zone within the first storage unit for each operator of a plurality of operators in the storage facility based upon a fatigue level of a corresponding operator;
   determining, by the server, a plurality of ergonomic scores for the plurality of operators, respectively, wherein an ergonomic score for each operator of the plurality of operators is determined based on one or more characteristics of the operation zone and one or more characteristics of the activity zone of the corresponding operator, the ergonomic score for each operator indicating a degree of ease of performing the first operation; and
   allocating, by the server, the first storage unit to a first operator of the plurality of operators for performing the first operation based on the plurality of ergonomic scores.

2. The method of claim 1,
   wherein the identification of the operation zone is based on a first item associated with the first operation, and wherein the first operation includes at least one of (i) picking the first item from the first storage unit and (ii) placing the first item in the first storage unit.

3. The method of claim 1,
wherein the operation zone is a first region of the first storage unit where the first operation is to be performed, and
wherein the one or more characteristics of the operation zone include first dimensions of the first region and a height of the first region from a floor level of the storage facility.

4. The method of claim 1, wherein the activity zone of each operator is further determined based on at least one of a height, an age, a gender, a strength level, and a medical condition of the corresponding operator.

5. The method of claim 1, wherein the activity zone of each operator is further determined based on at least one of a size, a shape, a weight, and a type of a first item associated with the first operation.

6. The method of claim 1, wherein the activity zone of each operator is further determined based on first dimensions and a height of a pick and place station associated with the corresponding operator.

7. The method of claim 1, wherein the ergonomic score of each operator is determined based on an overlap between the operation zone and the activity zone of the corresponding operator.

8. The method of claim 1, wherein the fatigue level of each operator is a function of time and one or more past operations performed by the corresponding operator.

9. The method according to claim 1, wherein the fatigue level is determined based on one of (i) a number of operations performed by each operator within a specified time period, (ii) a feedback from the corresponding operator, and (iii) a gesture recognition of the corresponding operator.

10. The method of claim 1, wherein
the first storage unit is a shelving unit, and
the operation zone is a region within the shelving unit in which the first operation is performed.

11. A system for facilitating one or more operations in a storage facility, the system comprising:
a server configured to:
receive a service request for performing a first operation in the storage facility,
identify, based on the service request, a first storage unit from a plurality of storage units in a storage area of the storage facility,
identify an operation zone within the first storage unit for performing the first operation,
determine an activity zone within the first storage unit for each operator of a plurality of operators in the storage facility based upon a fatigue level of a corresponding operator,
determine a plurality of ergonomic scores for the plurality of operators, respectively, wherein an ergonomic score for each operator of the plurality of operators is determined based on one or more characteristics of the operation zone and one or more characteristics of the activity zone of the corresponding operator, the ergonomic score for each operator indicating a degree of ease of performing the first operation, and
allocate the first storage unit to a first operator of the plurality of operators for performing the first operation based on the plurality of ergonomic scores.

12. The system of claim 11,
wherein the identification of the operation zone is based on a first item associated with the first operation, and
wherein the first operation includes at least one of picking the first item from the first storage unit or placing the first item in the first storage unit.

13. The system of claim 11,
wherein the operation zone is a first region of the first storage unit where the first operation is to be performed, and
wherein the one or more characteristics of the operation zone include first dimensions of the first region and a height of the first region from a floor level of the storage facility.

14. The system of claim 11, wherein the server further determines the activity zone of each operator based on at least one of a height, an age, a gender, a strength level, and a medical condition of the corresponding operator.

15. The system of claim 11, wherein the server further determines the activity zone of each operator based on at least one of a size, a shape, a weight, and a type of a first item associated with the first operation.

16. The system of claim 11, wherein the server further determines the activity zone of each operator based on first dimensions and a height, of a pick and place station associated with the corresponding operator.

17. The system of claim 11, wherein the server determines the ergonomic score of each operator based on an overlap between the operation zone and the activity zone of the corresponding operator.

18. The system of claim 11, wherein the fatigue level of each operator is a function of time and one or more past operations performed by the corresponding operator.

* * * * *